(12) United States Patent
Sonoura et al.

(10) Patent No.: US 10,370,201 B2
(45) Date of Patent: Aug. 6, 2019

(54) TRANSPORTING APPARATUS AND TRANSPORTING METHOD

(71) Applicant: Kabushiki Kaisha Toshiba, Minato-ku (JP)

(72) Inventors: Takafumi Sonoura, Yokohama (JP); Akihito Ogawa, Fujisawa (JP); Hideichi Nakamoto, Setagaya (JP); Atsushi Sugahara, Kawasaki (JP); Haruna Eto, Kawasaki (JP); Junya Tanaka, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 242 days.

(21) Appl. No.: 15/348,538

(22) Filed: Nov. 10, 2016

(65) Prior Publication Data

US 2017/0137236 A1    May 18, 2017

(30) Foreign Application Priority Data

Nov. 13, 2015  (JP) .................................. 2015-223266
Sep. 16, 2016  (JP) .................................. 2016-182388
Nov. 8, 2016   (JP) .................................. 2016-218465

(51) Int. Cl.
    *G06F 19/00*   (2018.01)
    *B65G 59/02*   (2006.01)
    (Continued)

(52) U.S. Cl.
    CPC ............. *B65G 59/02* (2013.01); *B65G 59/04* (2013.01); *B65G 61/00* (2013.01);
    (Continued)

(58) Field of Classification Search
    CPC ........ B65G 2203/0233; B65G 2203/04; B65G 2203/041; B65G 59/02; B65G 59/04; B65G 61/00
    See application file for complete search history.

(56) References Cited

U.S. PATENT DOCUMENTS 6,923,612 B2  8/2005  Hansl
9,067,744 B2  6/2015  Takizawa et al.
(Continued)

FOREIGN PATENT DOCUMENTS

JP    7-133006 A    5/1995
JP    2004-12143 A  1/2004
(Continued)

*Primary Examiner* — Harry Y Oh
(74) *Attorney, Agent, or Firm* — Oblon, McClelland, Maier & Neustadt, L.L.P.

(57) ABSTRACT

A transporter of an embodiment has a transporter, a detector, and a controller. The transporter holds a selected object from among a plurality of objects and transports the selected object in a first direction in a first state, and then configured to transport the selected object, while holding the selected object, in a second direction different from the first direction and not anti-parallel to the first direction, in a second state. The detector detects a change from the first state to the second state, wherein, in the second state, the transporter can transport the selected object in the second direction without disturbance by the presence of any other object than the selected object. The controller stops transporting the selected object in the first direction, in case that the detector detected the change from the first state to the second state.

17 Claims, 24 Drawing Sheets

(51) Int. Cl.
 *B65G 59/04* (2006.01)
 *B65G 61/00* (2006.01)
(52) U.S. Cl.
 CPC .. *B65G 2203/0233* (2013.01); *B65G 2203/04* (2013.01); *B65G 2203/041* (2013.01)

(56) References Cited

U.S. PATENT DOCUMENTS

| | | |
|---|---|---|
| 2003/0185656 A1 | 10/2003 | Hansl |
| 2006/0186271 A1* | 8/2006 | Jacobsen ................... B60P 1/36 244/137.1 |
| 2010/0092272 A1* | 4/2010 | Echelmeyer ......... B65G 47/907 414/591 |
| 2013/0096713 A1 | 4/2013 | Takizawa et al. |
| 2013/0193108 A1* | 8/2013 | Zheng ..................... C23C 14/54 216/59 |
| 2014/0079524 A1 | 3/2014 | Shimono et al. |
| 2014/0111812 A1* | 4/2014 | Baeg ....................... G01B 11/25 356/610 |
| 2015/0191333 A1* | 7/2015 | Kouhia ................... B66C 13/46 356/614 |
| 2015/0344225 A1 | 12/2015 | Nakamura et al. |
| 2016/0122161 A1* | 5/2016 | Mannari ................... B66C 1/42 700/275 |

FOREIGN PATENT DOCUMENTS

| | | |
|---|---|---|
| JP | 2013-86914 A | 5/2013 |
| JP | 2013-129034 A | 7/2013 |
| JP | 2013-154457 A | 8/2013 |
| JP | 5366031 B2 | 12/2013 |
| JP | 2014-50936 A | 3/2014 |
| JP | 2014-61560 A | 4/2014 |
| JP | 5510841 B2 | 6/2014 |
| JP | 2015-224125 A | 12/2015 |
| JP | 2016-222377 A | 12/2016 |

* cited by examiner

FIG. 25
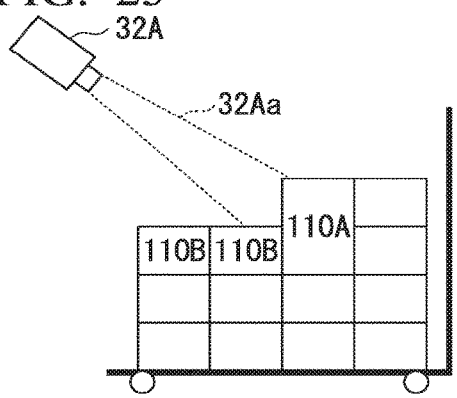 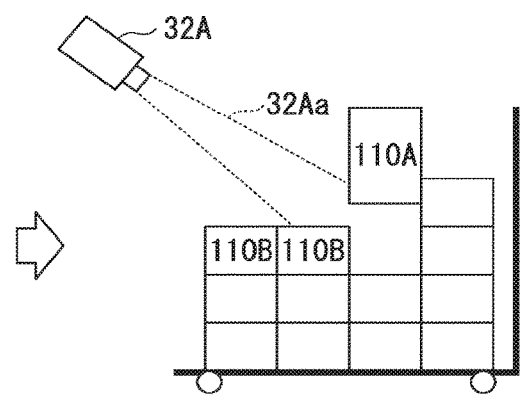
FIG. 26
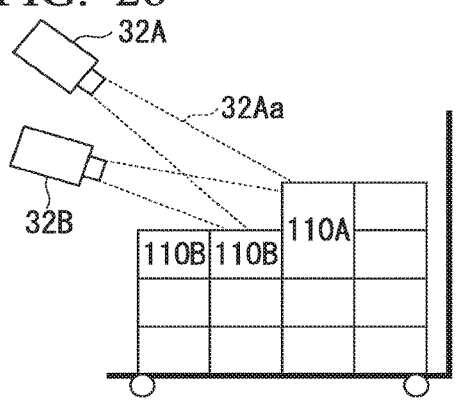 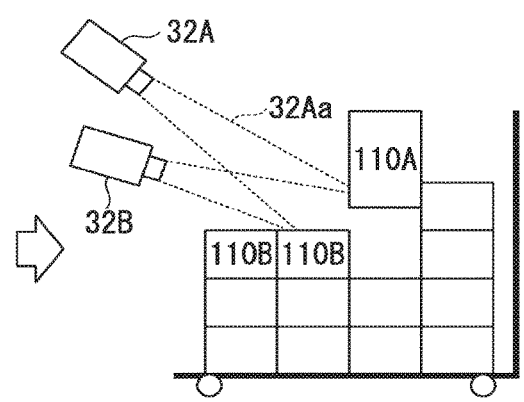
FIG. 27
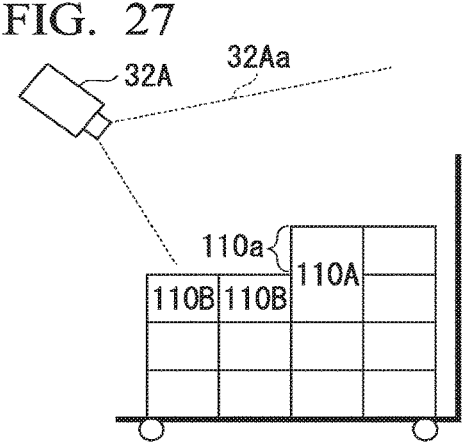 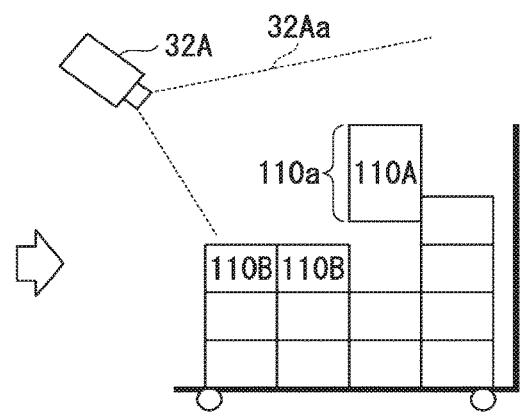

TRANSPORTING APPARATUS AND TRANSPORTING METHOD

CROSS-REFERENCE TO RELATED APPLICATION

This application is based upon and claims the benefit of priority from Japanese Patent Application No. 2015-223266, filed Nov. 13, 2015, Japanese Patent Application No. 2016-182388, filed Sep. 16, 2016 and Japanese Patent Application No. 2016-218465, filed Nov. 8, 2016 the entire contents of which are incorporated herein by reference.

FIELD

Embodiments of the present invention relate to a transporting apparatus and a transporting method.

BACKGROUND

Conventionally, a transporter that automates the task of retrieving objects by de-palletizing them from a pallet onto which numerous objects have been stacked has been known. The transporter, for example, holds an object using a holder provided on the distal end of an arm and transports the item. There has been a desire that the transporter retrieve objects in a shorter time.

BRIEF DESCRIPTION OF THE DRAWINGS

FIG. 25 shows another example of the transporting apparatus 1 of the first embodiment.

FIG. 26 shows another example of the transporting apparatus 1 of the first embodiment.

FIG. 27 shows another example of the transporting apparatus 1 of the first embodiment.

Some embodiments are directed to a transporter and transporting method. A transporter of an embodiment has a transporter, a detector, and a controller. The transporter holds a selected object from among a plurality of objects and transports the selected object in a first direction in a first state, and then configured to transport the selected object, while holding the selected object, in a second direction different from the first direction and not anti-parallel to the first direction, in a second state. The detector detects a change from the first state to the second state, wherein, in the second state, the transporter can transport the selected object in the second direction without disturbance by the presence of any other object than the selected object. The controller stops transporting the selected object in the first direction, in case that the detector detected the change from the first state to the second state.

A transporting apparatus and a transporting method of embodiments are described below, with references made to the drawings. In this case, as an expediency in the description, the +X direction, the −X direction, the +Y direction, the −Y direction, the +Z direction, and the −Z direction will be defined. The +X direction, the −X direction, the +Y direction, and the −Y direction are directions along a substantially horizontal plane. The −X direction is opposite from the +X direction. In the embodiments, the −X direction is the "direction of pulling the object 110 forward." The "direction of pulling the object 110 forward" is the direction of moving from the box pallet 100 toward the supporter 30. The +Y direction is a direction that intersects with the +X direction (for example, a substantially orthogonal direction). The −Y direction is opposite from the +Y direction. The +Z direction intersects with the +X direction and the +Y direction (for example a substantially orthogonal direction), for example, it is a substantially vertically upward direction. The −Z direction is opposite from the +Z direction, for example, a substantially vertically downward direction.

First Embodiment

Figure 1:
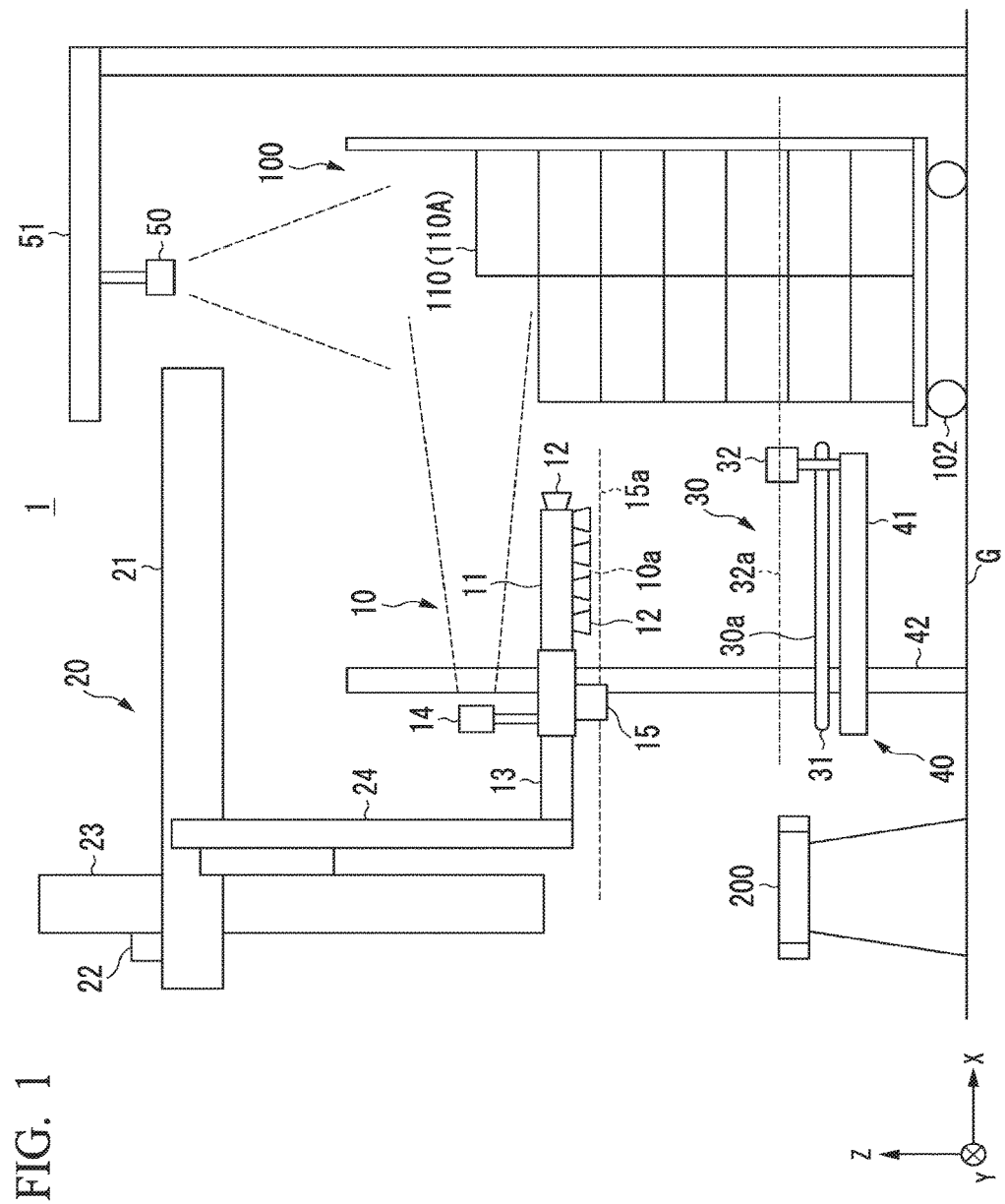
FIG. 1 shows an example of a transporting apparatus 1 of the first embodiment.
Figure 2:
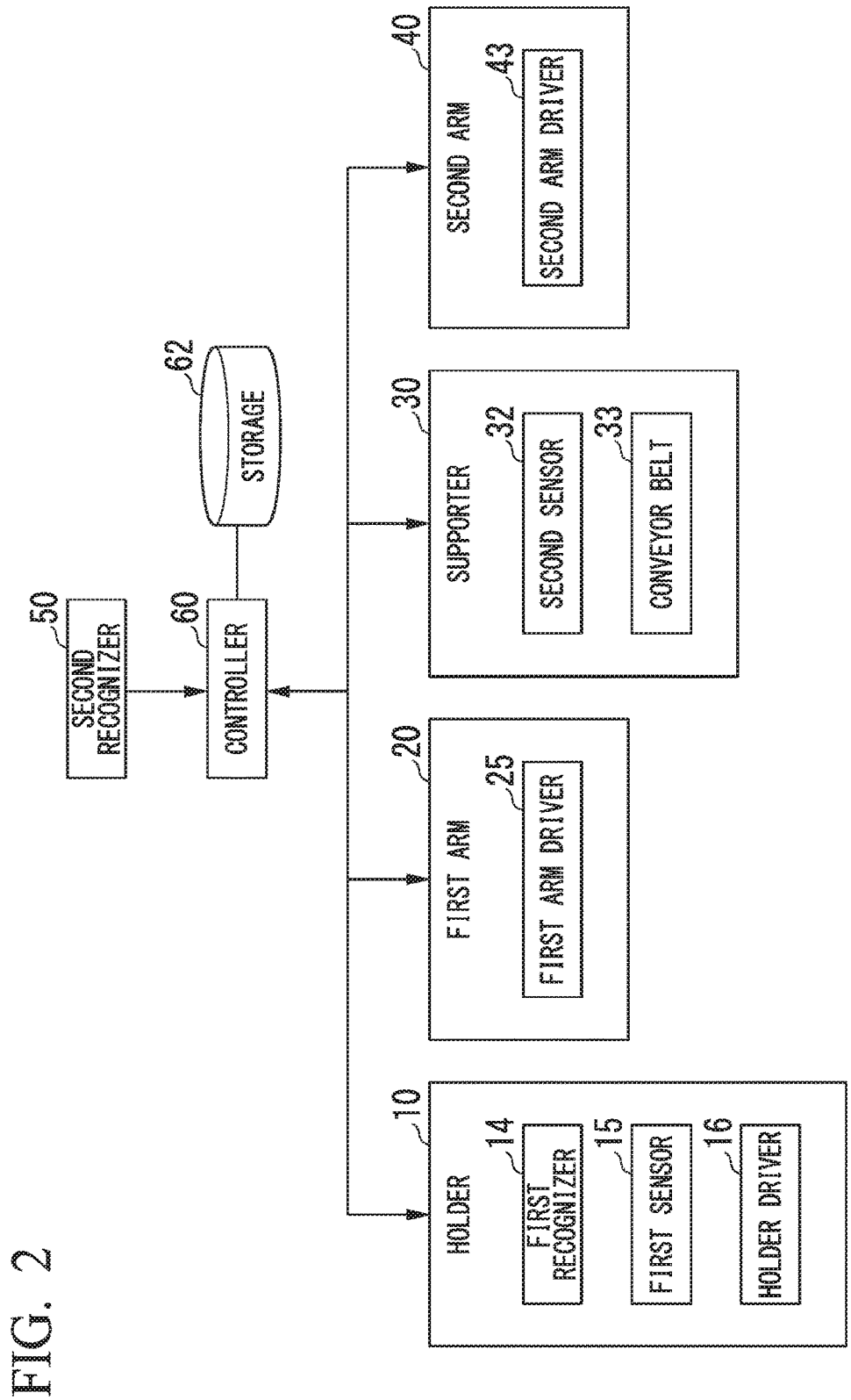
FIG. 2 is a block diagram showing an example of the transporting apparatus 1 of the first embodiment.

FIG. 1 shows an example of a transporting apparatus 1 of the first embodiment. FIG. 2 is a block diagram showing an example of the transporting apparatus 1 in the first embodiment. The transporting apparatus 1 of the first embodiment, for example as shown in FIG. 1 and FIG. 2, has a holder 10, a first arm 20, a supporter 30, a second arm 40, second recognizer 50, a controller 60, and a storage 62.

In FIG. 1, the holder 10 and the supporter 30 are disposed on the −X direction relative to the position to which the box pallet 100 will be moved. The supporter 30 and the second arm 40 are disposed in the +X direction side of the conveyor belt 200 (second supporter). The first arm 20, the second arm 40, and the conveyor belt 200 are, for example, fixed to the ground surface G.

When an object 110 is to be retrieved from the box pallet 100, the box pallet 100 is moved toward the +X direction side of the supporter 30 and the second arm 40. The box pallet 100 is, for example, a rolling box pallet (RBP) having casters 102. The box pallet 100 may be one that moves along rails (not shown).

If the box pallet 100 has been moved to the +X direction side of the supporter 30 and the second arm 40, an object 110 that had been stacked on the box pallet 100 is taken out and transported to the supporter 30. The destination to which the transporting apparatus 1 transfers the object 110 (retrieval location) is not restricted to being the supporter 30, and may be a supporter such as a hand truck, a pallet, or a work table.

The holder 10 has, for example, a hand 11, suction pads 12, a linking section 13, a first recognizer 14, a first sensor 15, and a holder driver 16. The holder 10 is, for example, an end effector. A plurality of suction pads 12 are mounted to the hand 11, on the surface on the vertically downward side (−Z direction) of the hand 11, and on the side surface (+X direction) thereof.

The suction pads 12 are contacting parts that make contact with and hold the object 110. In the following, the plane that suction holds the object 110 by the suction pads 12 will be noted as the "holding plane 10a." When the object 110 is held, the holding plane 10a is brought into opposition with the top surface of the object 110 that faces vertically upward. The "top surface" in the embodiments means the upper surface that is positioned the highest in the object 110. By removing the suction holding of the object 110 by the suction pads 12, the holding of the object 110 is released. The holder driver 16 has, for example, a vacuum pump linked to the suction pads 12. The holder driver 16 holds the object 110 to the suction pads 12 and releases the holding of the object 110.

Figure 3:
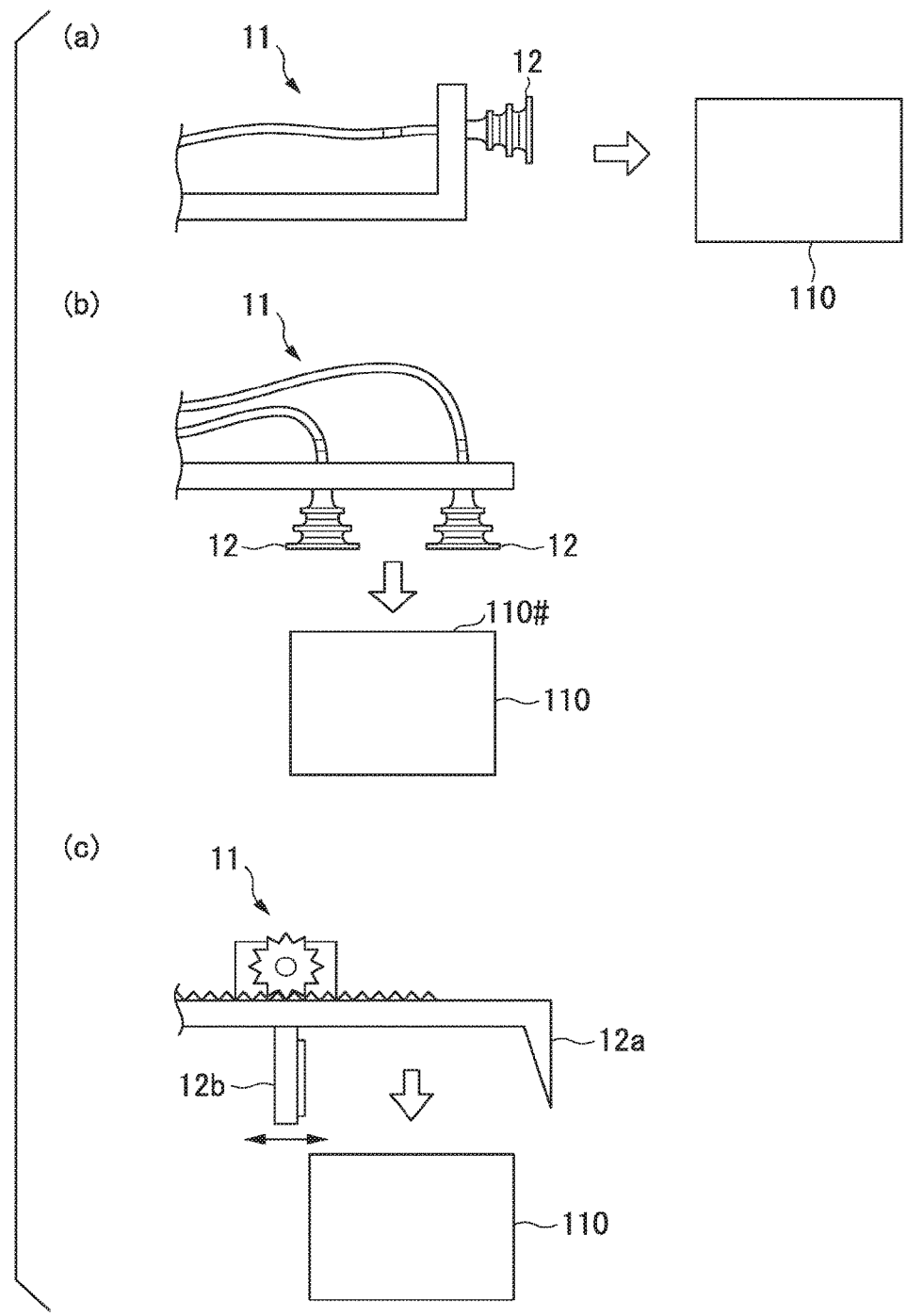
FIG. 3 shows an example of a holder 10 in the first embodiment.

It is sufficient that the holder 10 be able to hold the object 110, and it is not restricted to gripping, but may rather hold by sandwiching. FIG. 3 shows an example of the holder 10 in the first embodiment. As shown in FIG. 3(a), the suction pads 12 are provided on the side surface of the hand 11, enabling the holding of the transporting object 110 by suction. As shown in FIG. 3(b), the suction pads 12 are provided on the vertically downward side of the hand 11. The suction pads 12 can hold by holding the top surface 110# of the object 110 by suction. Additionally, as shown in FIG. 3(c), the holder 10 can hold the object 110 by sandwiching by a fixed part 12a and a moving part 12b.

The hand 11 is connected to the first arm 20 via the linking section 13. The hand 11 is, for example, movable in the directions of three axes, including in the vertical direction and the horizontal direction, by the first arm 20. In the case in which the objects 110 are stacked with an inclination with respect to the XY plane or the XZ plane, to cause the holding plane 10a to be opposite the inclined surface, the hand 11 may be able to move in the rotational direction in addition to the directions of the three axes.

The first recognizer 14 is, for example, a three-dimensional distance image sensor that includes a light source and a camera. The three-dimensional distance image sensor can be implemented by a camera capable of measuring three-dimensional positions, such as an infrared dot pattern projection camera. An infrared dot pattern projection type camera projects an infrared dot pattern onto the object 110 and captures an infrared image of the object 110. The three-dimensional distance image sensor analyzes the infrared image to acquire three-dimensional information of the object 110. The infrared dot pattern projection camera may capture either a color image or a monochrome image. The first recognizer 14, in addition to the infrared dot pattern projection camera, may further include an optical sensor such as a camera or the like that acquires a color image or a monochrome image.

The first recognizer 14 is mounted on the +Z direction side of the hand 11. The first recognizer 14 adjusts the imaging direction to the direction that images the objects 110 stacked onto the box pallet 100. The first recognizer 14 imaging direction need not be the same as the horizontal direction, and it is sufficient that it be a direction from which the objects 110 stacked on the box pallet 100 can be imaged from the −X direction side of the objects 110. The first recognizer 14 moves together with the hand 11. For that reason, the first recognizer 14 can perform recognition over a broad range. When performing recognition of the object 110, the first recognizer 14 is moved to a position that is slightly lower than the upper limit of the range of recognizing the highest position of the object 110. The first recognizer 14 generates and transmits to the controller 60 image information captured by the camera and distance information in the second direction. Although the second direction is horizontal in the embodiment, this is not a restriction. The horizontal direction is an example of a direction that crosses with the first direction.

Although the first sensor 15 is an optical rangefinder that includes a light source and a light receiver (laser rangefinder: LRF), this is not a restriction. The first sensor 15 scans the laser light irradiated from the light source and receives the reflected light, so as to measure the distance. A scanning plane 15a of the first sensor 15 is set to be a plane parallel to the XY plane. The first sensor 15 is mounted to a surface on the −Z direction side of the hand 11 (lower surface). The installation position of the first sensor 15 is adjusted so that the scanning plane 15a is offset in the vertically downward direction from the holding plane 10a by a prescribed tiny amount. The first sensor 15 transmits to the controller 60 distance information in the depth direction generated by measuring the distance of the object 110 in the second direction.

Although the first arm 20 includes an X-axis arm 21, a Y-axis arm 22, a Z-axis arm 23, a linking section 24, and a first arm driver 25, this is not a restriction. The first arm 20 is an orthogonal robot arm and is an example of a multi jointed arm. The X-axis arm 21, the Y-axis arm 22, and the Z-axis arm 23 are connected to the holder 10 via the linking section 24. The X-axis arm 21 moves the holder 10 in the X-axis direction (horizontal direction). The Y-axis arm 22 moves the holder 10 in the Y-axis direction (horizontal direction). The Z-axis arm 23 moves the holder 10 in the Z-axis direction (vertical direction). The first arm driver 25 includes actuators that are connected to each of the X-axis arm 21, the Y-axis arm 22, and the Z-axis arm 23, but is not restricted to this. The first arm driver 25, following control by the controller 60, moves the holder 10 by driving the X-axis arm 21, the Y-axis arm 22, and the Z-axis arm 23.

The supporter 30 includes a conveyor belt 31, a first arm sensor 32, and a conveyor driver 33, but is not restricted to these. The conveyor belt 31 includes a belt and a drive roller and the like, but is not restricted to these. The conveyor belt 31 supports the lower surface of the object 110. In the following, the plane in which the conveyor belt 31 supports the object 110 will be called the supporting surface 30a. The conveyer driver 33 is driving motor that drives the conveyer belt 31. The conveyor belt 31 is driven by the conveyor belt driver 33 and transports the object 110 to the conveyor belt 200 side. The conveyor belt 200 transports toward the +Y direction side the object 110 transported by the conveyor belt 31.

The second sensor 32 is an optical rangefinder (LRF) that includes a light source and a light receiver, but this is not a restriction. The second sensor 32 scans with laser light irradiated from the light source and receives the reflected light so as to detect the distance in the horizontal direction between a detection reference point and the object 110 (including the transporting object 110A). The installation position of the second sensor 32 corresponds to the detection reference point for detection of the distance to the object 110 in the horizontal direction. The scanning plane 32a (reference plane) of the second sensor 32 is established as a plane that is parallel to the XY plane. The second sensor 32 is mounted on the side of the conveyor belt 31 facing vertically upward. The installation position of the second sensor 32 is adjusted so that a plane that is offset by just a prescribed slight first reference distance vertically upward from the supporting surface 30a of the support 30 becomes the scanning plane 32a. The second sensor 32 transmits to the controller 60 second-direction distance information that is generated by measuring the distance of the object 110 in the second direction.

The second arm 40 includes an X-axis arm 41, a Z-axis arm 42, and a second arm driver 43, but is not restricted to these. The X-axis arm 41 and the Z-axis arm 42 are connected to the support 30 via a linking section (not shown). The X-axis arm 41 moves the support 30 in the X-axis direction (horizontal direction). The Z-axis arm 42 moves the second arm 40 in the Z-axis direction (vertical direction). The second arm driver 43 includes actuators that are connected, respectively, to the X-axis arm 41 and the Z-axis arm 42, but is not restricted to these. The second arm driver 43 moves the holder 10 by driving the X-axis arm 41 and the Z-axis arm 43, following control by the controller 60.

The second recognizer 50 is a three-dimensional distance image sensor that includes a light source and a camera. The second recognizer 50 is a three-dimensional distance image sensor that includes a light source and a camera, but is not restricted to these. The three-dimensional distance image sensor may be a camera capable of measuring the three-dimensional position, such as an infrared dot pattern projection camera. The second recognizer 50 is mounted to the lower surface of the mounting plate 51 that is installed above the position of installation of the box pallet 100. The second recognizer 50 is adjusted so that the imaging direction is the direction that images the objects 110 stacked on the box pallet 100. The imaging direction of the second recognizer 50 need not be the same as the vertical direction, and it is sufficient that it be a direction enabling imaging of the objects 110 stacked on the box pallet 100 from the upwardly vertical side of the objects 110. The second recognizer 50 generates and transmits to the controller 60 image information captured by the camera and distance information in the vertical direction.

The controller 60 is implemented by executing a program stored in the program memory of a processor such as a CPU (central processing unit), but is not restricted to that. A part or the entirety of the controller 60 may be implemented by hardware such as an LSI (large-scale integration) device, an ASIC (application-specific integrated circuit), or an FPGA (field-programmable gate array).

The controller 60, by controlling the holder 10 and the first arm 20, transports the transporting object 110A of the objects 110 in the vertical direction and the horizontal direction. The controller 60, based on information transmitted by the first recognizer 14 and the second recognizer 50, recognizes the height of the top surface of the objects surrounding the objects 110. If the object 110 is lifted in the vertically upward direction and is detected as being in the state in which movement in the horizontal direction is possible, the controller 60 stop the transporting of the object 110 in the vertically upward direction. In the description of the embodiment to follow, if the state in which an object 110 can be moved in the horizontal direction is detected, it is an example of stopping the transporting of the object 110 in the vertically upward direction.

The controller 60 sets the reference plane (setter), based on the height of the top surface of the objects surrounding the object 110. The reference plane is, for example, a plane that is parallel to the XY plane. The controller 60, based on the distance detected by the second sensor 32 that detects the distance between the detection reference point and the transporting object 110A in the reference plane, stops the transporting of the object 110 in the vertically upward direction.

The storage 62 is implemented, for example, by a HDD (hard-disk drive), a flash memory, an EEPROM (electrically erasable programmable read-only memory), a ROM (read-only memory), or a RAM (random-access memory). The storage 62 stores, for example, various programs such as firmware and application programs, the processing results of the controller 60, and information transmitted by the first recognizer 14, the first sensor 15, the second sensor 32, and the second recognizer 50.

Figure 4:
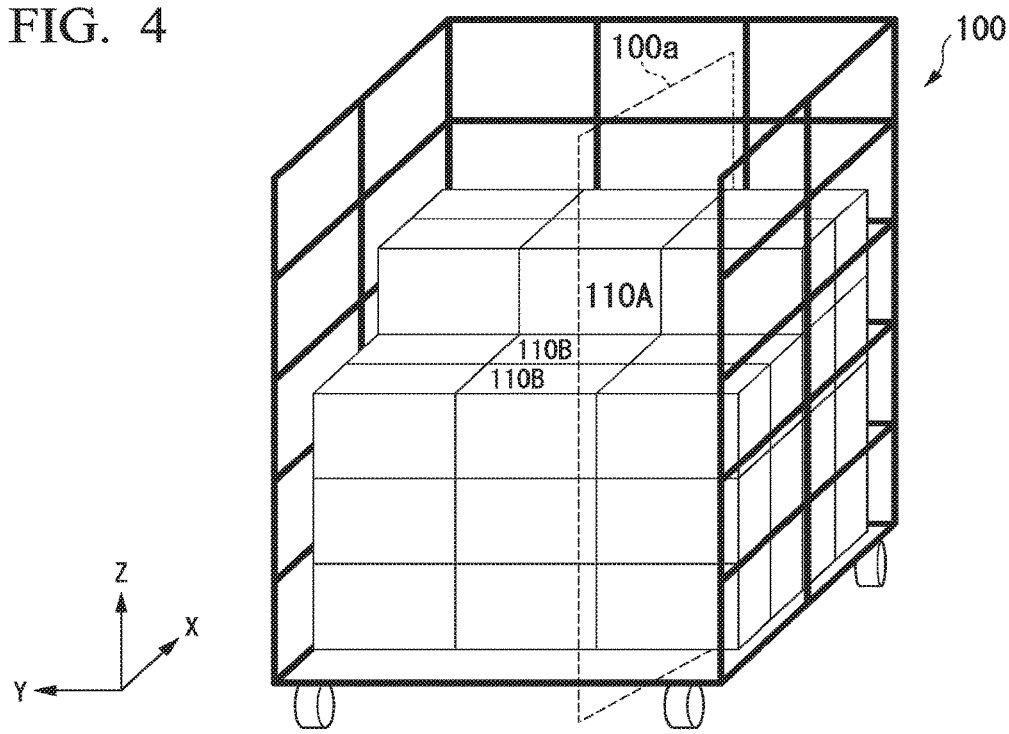
FIG. 4 is an oblique view of a box pallet 100 of the first embodiment.
Figure 5:
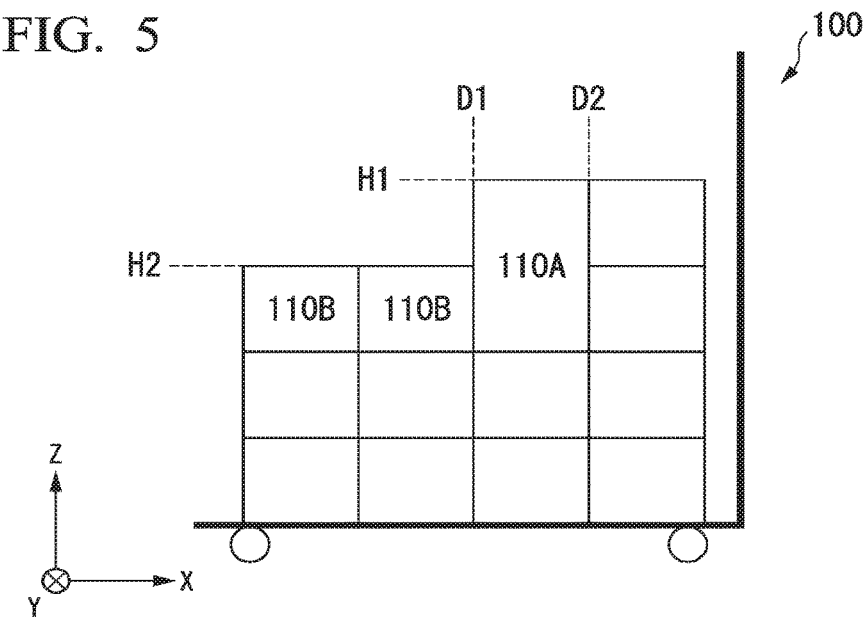
FIG. 5 is a cross-sectional view showing an example of the box pallet 100 of the first embodiment, viewed from the plane 100a in FIG. 4.
Figure 6:
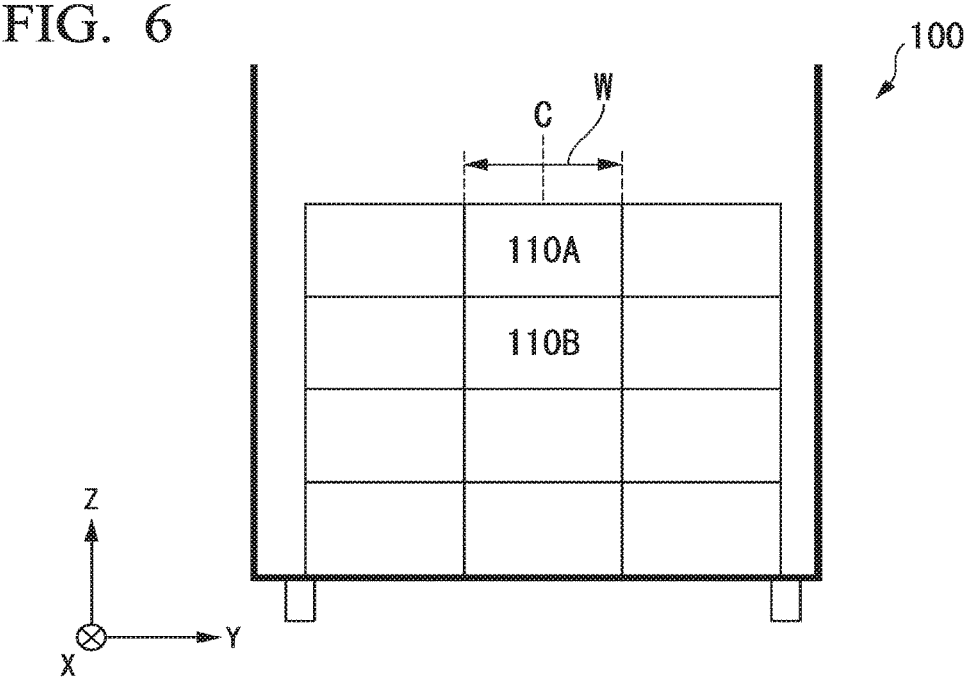
FIG. 6 shows an example of the box pallet 100, viewed from the −X direction side in the first embodiment.

The operation of setting the reference plane based on the top surface height of objects surrounding the object in the transporting apparatus 1 of the first embodiment will now be described. FIG. 4, FIG. 5, and FIG. 6 show an example of a box pallet 100 into which a transporting object 110A to be transported by the transporting apparatus 1 of the first embodiment is stacked. FIG. 4 is an oblique view of the box pallet 100 of the first embodiment. FIG. 5 is a cross-sectional view showing an example of the box pallet 100 as seen from the plane 100a in FIG. 4 in the first embodiment. FIG. 6 is a drawing showing an example of the box pallet 100 seen from the −X direction side in the first embodiment.

The controller 60 receives image information and distance information transmitted by the first recognizer 14, and image information and distance information transmitted by the second recognizer 50. The controller 60, based on the image information and the distance information received from the first recognizer 14 and the second recognizer 50, recognizes the position and the shape of an object 110 stacked into the box pallet 100. The controller 60 selects one object 110 from among a plurality of objects 110 as the transporting object 110A. The controller 60, for example, selects, from among the plurality of objects 110, the object 110 having the highest top surface as the transporting object 110A. The controller 60 calculates the position of an item (for example object 110B) having the second highest top surface in the region determined based on the position of the transporting object 110A.

The controller 60, for example, recognizes the top surface height position H1 of the selected transporting object 110A, the distance D1 to the front side of the top surface, the center position C of the front side of the top surface, the depth-side distance D2 of the top surface, the width W of the object (the length of the front-side edge of the top surface in the Y-axis direction), and the height position H2. The controller 60, based on the height position H2, sets the reference plane (setter). The reference plane is an XY plane that includes a position on the vertically upward direction side from the top surface position in the vertical direction of the object 110B that overlaps with the item width W of the transporting object 110A in the Y-axis direction and is an object 110 that is disposed to the −X direction side from the transporting object 110A. From the standpoint of suppressing the amount of movement of the holder 10, it is desirable that the reference plane be at a position on the vertically upward side distanced by a small amount with respect to the top surface position in the vertical direction of the object 110B. The controller 60 expresses the recognized top surface height position H1, the height position H2, the distance D1 to the front side of the top surface, the central position C at the front side of the top surface, the object width W, the depth distance D2 of the top surface, and the reference plane in the absolute coordinate system, and stores this information into the storage 62 as information of the object 110.

In the first embodiment, in order to make up for the narrowness of the picture angle in the vertical direction, the first recognizer 14 can be moved in the vertical direction, linked to the hand 11. However, cases such as when the picture angle in the Y-axis direction is narrower than the Y-axis direction length of the box pallet 100 or when the resolution of the captured image of the object 110 in the horizontal direction is insufficient, the first recognizer 14 may be movable with respect to the hand 11 in the X-axis direction and the Y-axis direction. Although the second recognizer 50 is installed at a fixed position in the first embodiment, if the picture angle is narrow with respect to the size of the box pallet 100, it may be movable in the XY plane.

In the first embodiment, there is a case in which an intermediate shelf or the like exists in the box pallet 100, and the second recognizer 50 cannot recognize objects 110 below the intermediate shelf. In such cases, the transporting apparatus 1 may have a small camera mounted in the hand 11 and move the hand 11 to image an object 110 in a region that cannot be recognized by the second recognizer 50. Because the top surface height position H1 and distance D1 to the front side of the top surface of the object 110 are recognized by the first sensor 15, in the condition in which the hand 11 is moved to up to in front of the top surface front side distance D1, the transporting apparatus 1 images the top surface of the object 110 by the small camera. The controller 60, based on the image captured by the small camera, detects the depth-side edge of the top surface of the object 110 and moves the hand 11 again so that it is positioned more forward than the deep side edge of the top surface of the object 110.

Additionally, the reference plane is set by the transporting apparatus 1 in the first embodiment, this is not a restriction, and the transporting apparatus 1 may acquire information for identifying a reference plane that is set by an external device, in which case the transporting apparatus 1 need not have a functional part for setting the reference plane.

Figure 7:
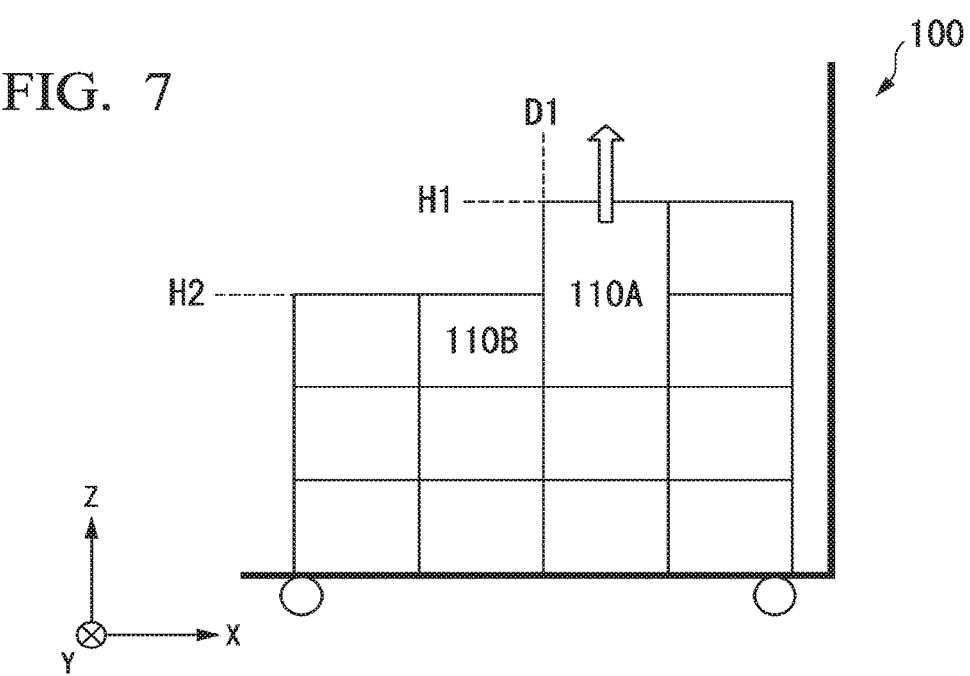
FIG. 7 shows an example of the operation of lifting up a transporting object 110A in the first embodiment.
Figure 8:
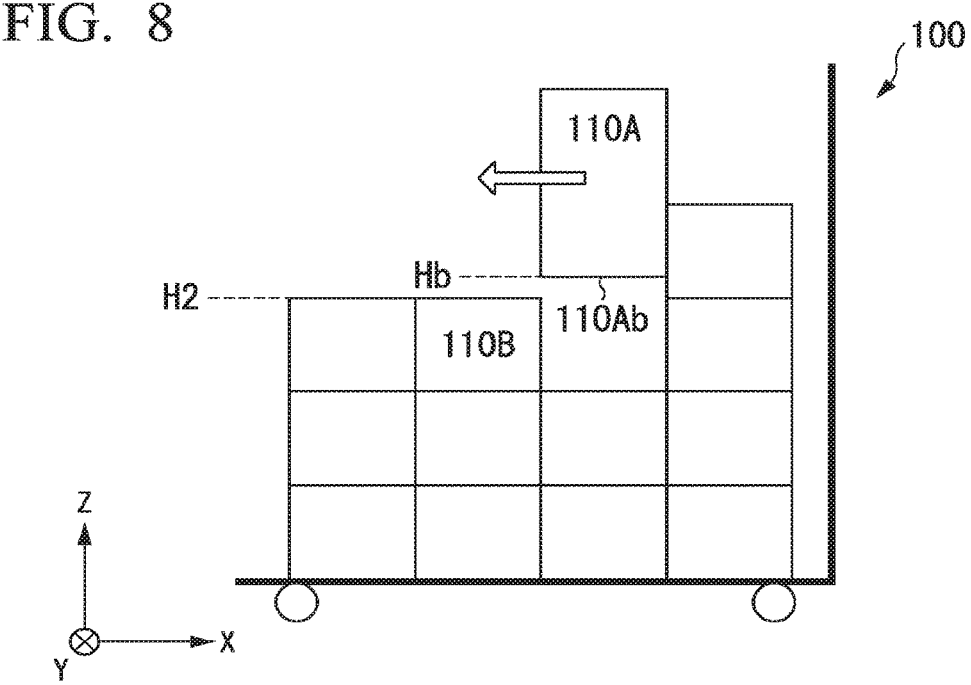
FIG. 8 shows an example of the operation of pulling closer the transporting object 110A in the transporting apparatus 1 of the first embodiment.

The transport rule for extracting the transporting object 110A from the box pallet 100 in the transporting apparatus 1 of the first embodiment will now be described. FIG. 7 shows an example of the operation to pull up a transporting object 110A in the first embodiment. FIG. 8 shows an example of the operation of pulling the transporting object 110A closer in the transporting apparatus 1 of the first embodiment.

The transport rule for the transporting object 110A is as follows. First, the transporting apparatus 1, as shown in FIG. 7, grips the transporting object 110A having a top surface height position H1 that is at the highest position, and pulls it upward in the first direction (vertically upward direction). Next, if the height position Hb, which is the height of the bottom surface 110Ab of the transporting object 110A, has passed the height position H2, which corresponds to the top surface height of the object 110B, as shown in FIG. 8, the transporting apparatus 1 pulls the transporting object 110A in the second direction (−X direction). The first state is that the transporting object 110A is transported in the first direction (vertically upward direction), and the height position Hb of the bottom surface 110Ab of the transporting object 110A is not higher than the height position H2. The second state is that the object 110B can be transported in horizontal direction when the height position Hb of the bottom surface 110Ab of the transporting object 110A has passed the height position H2.

Figure 9:
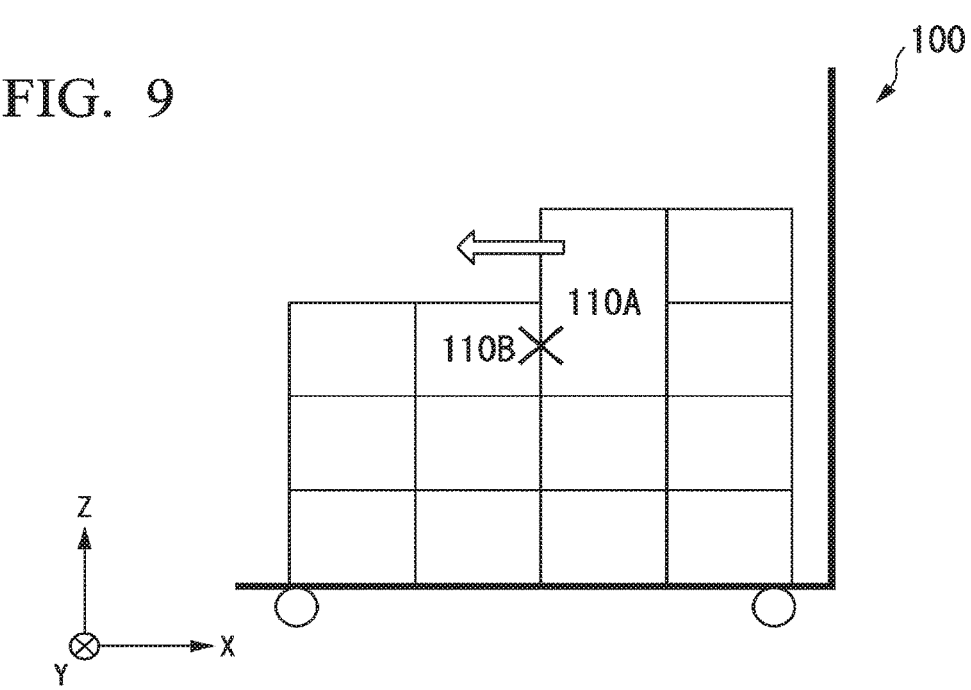
FIG. 9 shows the transporting procedure of a first comparison example.
Figure 10:
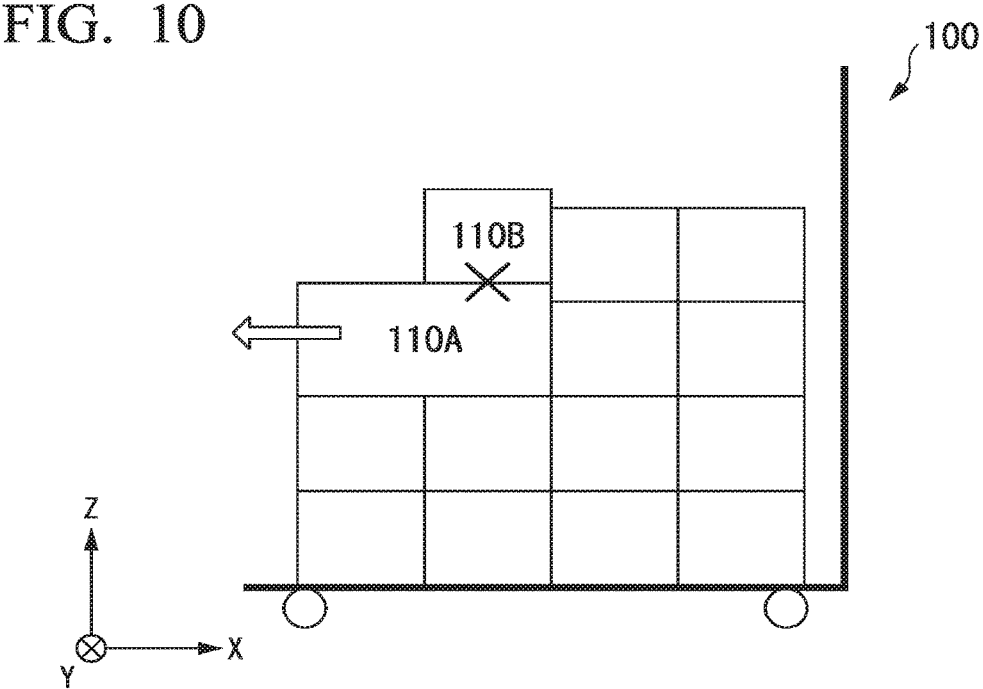
FIG. 10 shows the transporting procedure of a second comparison example.
Figure 11:
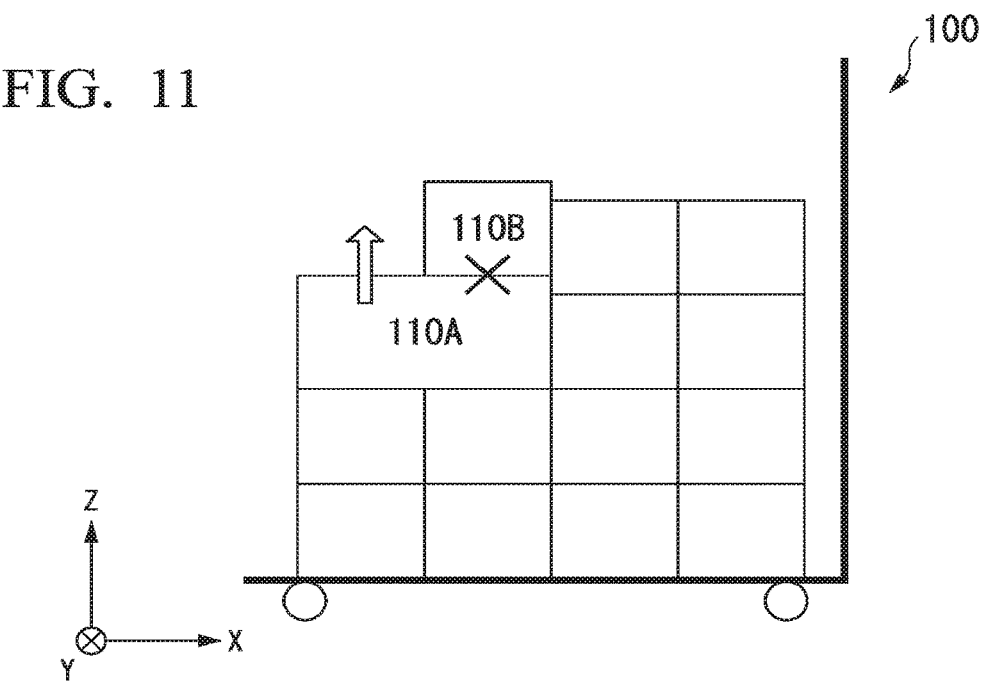
FIG. 11 shows the transporting procedure of a third comparison example.

By doing this, the transporting apparatus 1 can avoid having the transporting object 110A getting caught on the transporting object 110B, as in the comparison examples shown in FIG. 9, FIG. 10, and FIG. 11. FIG. 9 shows the transport procedure in the first comparison example, in which, because the transporting object 110A is pulled in the −X direction before it is pulled upward, the transporting object 110A catches on the transporting object 110B. FIG. 10 shows the transport procedure of the second comparison example, in which, because the transporting object 110A, on the top surface of which is stacked the object 110B, is pulled closer in the −X direction, the transporting object 110A is caught on the object 110B. FIG. 11 shows the transport procedure of the third comparison example, in which, because the transporting object 110A, on the top surface of which is stacked the object 110B, is pulled upward in the +Z direction, the transporting object 110A is caught on the object 110B.

Figure 12:
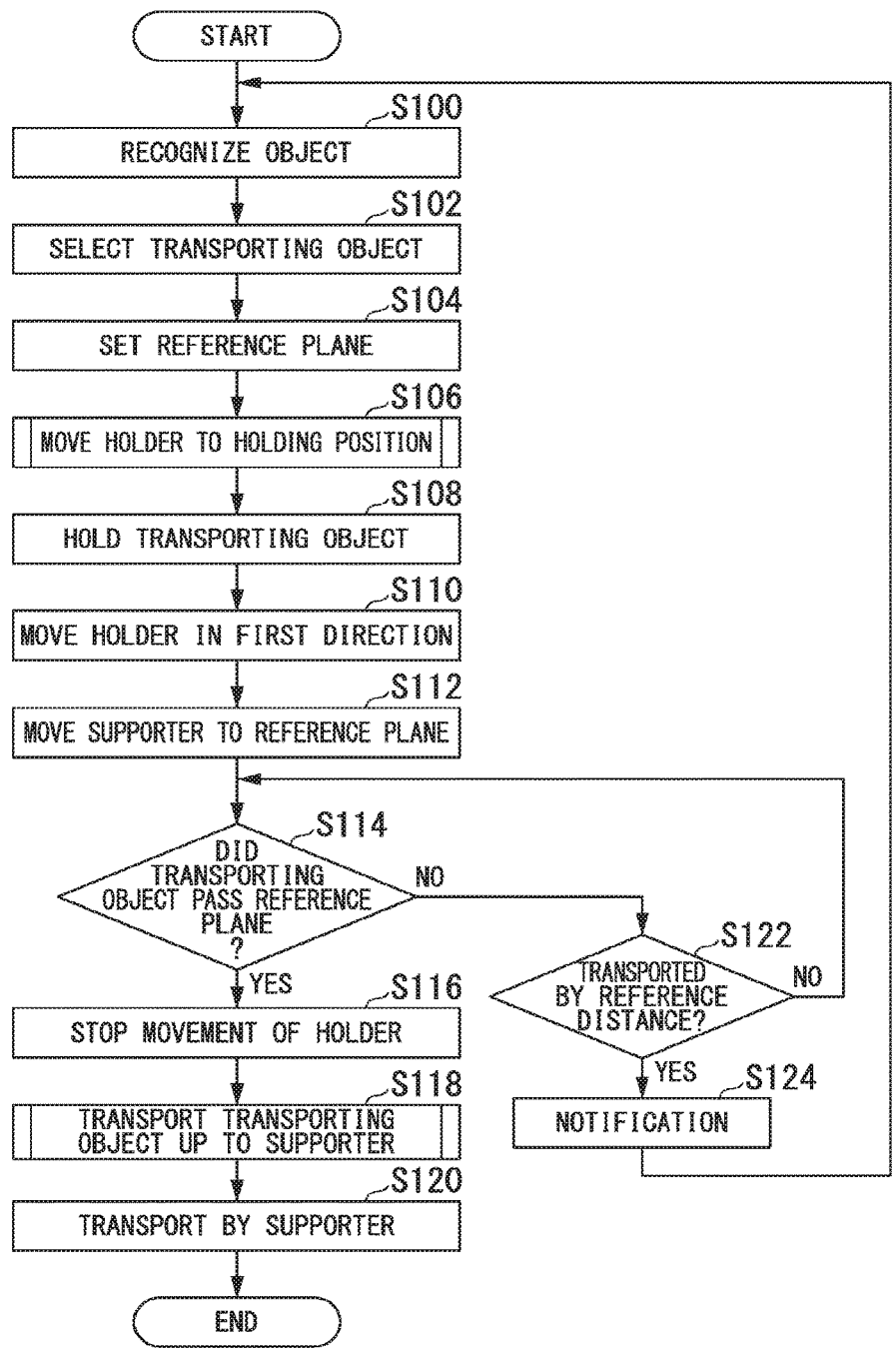
FIG. 12 is a flowchart showing an example of the operating procedure of the transporting apparatus 1 of the first embodiment.
Figure 13:
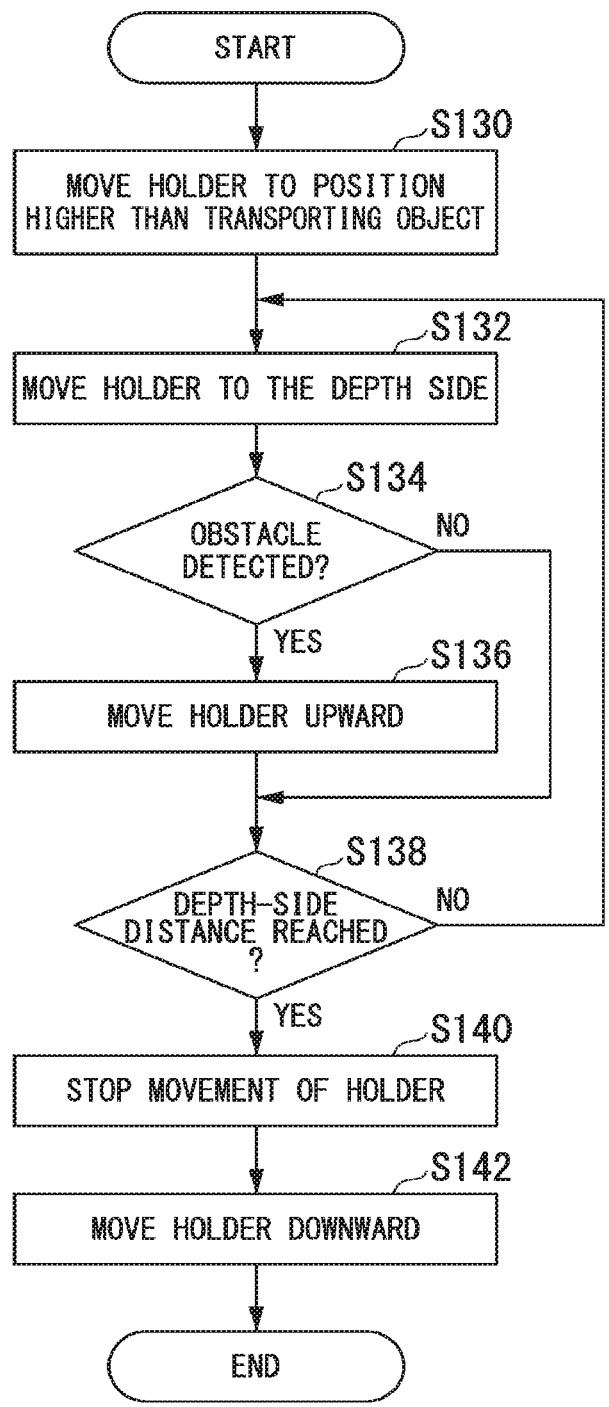
FIG. 13 is a flowchart showing an example of the operating procedure of moving the holder 10 up to the holding position in the transporting apparatus 1 of the first embodiment.
Figure 14:
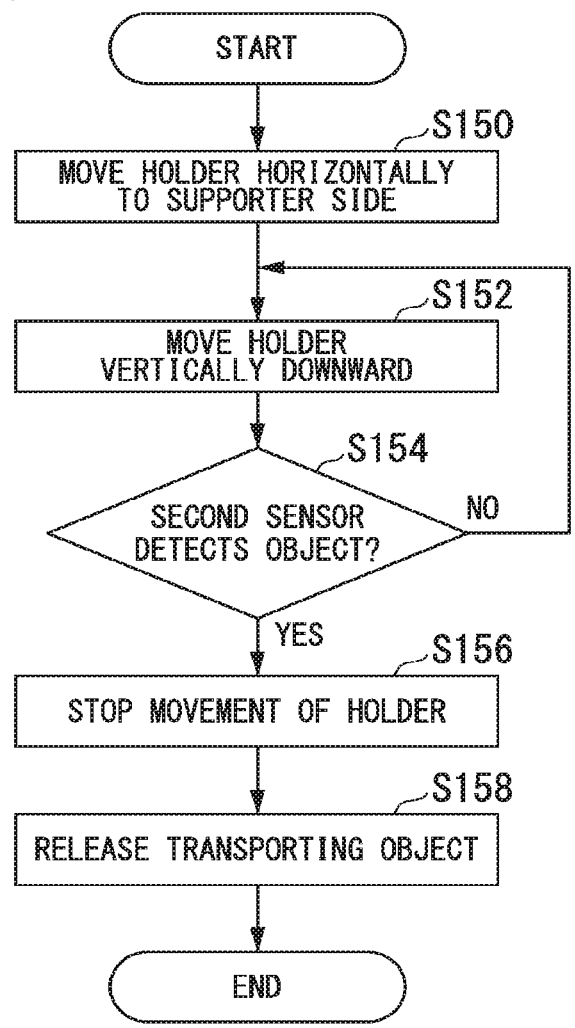
FIG. 14 is a flowchart showing an example of the operating procedure of transporting the transporting object 110A up to the supporter 30 in the transporting apparatus 1 of the first embodiment.

The operation of the transporting apparatus 1 of the first embodiment removing the transporting object 110A from the box pallet 100 and transporting the transporting object 110A to the support 30 will now be described. FIG. 12 is a flowchart showing an example of the operating procedure of the transporting apparatus 1 of the first embodiment. FIG. 13 is a flowchart showing an example of the operating procedure of moving the holder 10 up to the holding position in the transporting apparatus 1 of the first embodiment. FIG. 14 is a flowchart showing an example of the operating procedure of transporting the transporting object 110A up to the transporter 30 in the transporting apparatus 1 of the first embodiment.

First, the controller 60 recognizes the objects 110 (step S100). The controller 60 receives information of an object 110, based on the recognition by the first recognizer 14 and the second recognizer 50, from among the objects 110 stacked in the box pallet 100. The controller 60 stores the received information into the storage 62.

Next, the controller 60 selects the transporting object 110A (step S102). The controller 60 selects as the transporting object 110A the object 110 having the highest top surface height position H1 from the object 110 information stored in the storage 62.

Next, the controller 60 sets the reference plane (step S104). The controller 60 selects an object 110 that is disposed to the −X direction side from the transporting object 110A and that overlaps with the object width W of the transporting object 110A in the Y-axis direction as the object 110B. The controller 60 sets the reference plane based on the top surface height position H1 of the selected object 110B.

Figure 15:
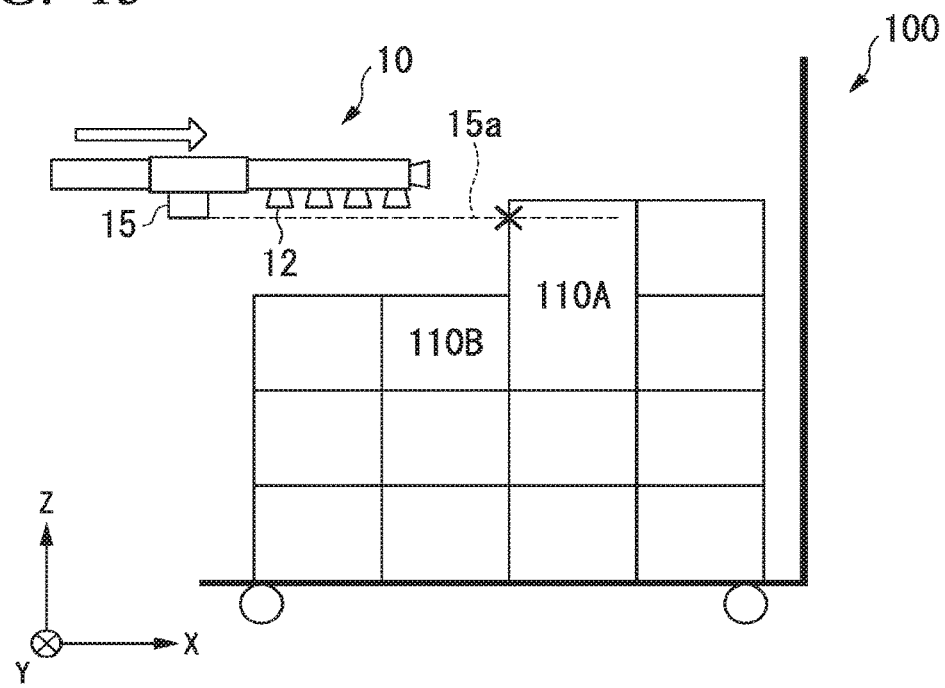
FIG. 15 shows an example of the positioning operation by the transporting apparatus 1 of the first embodiment.
Figure 16:
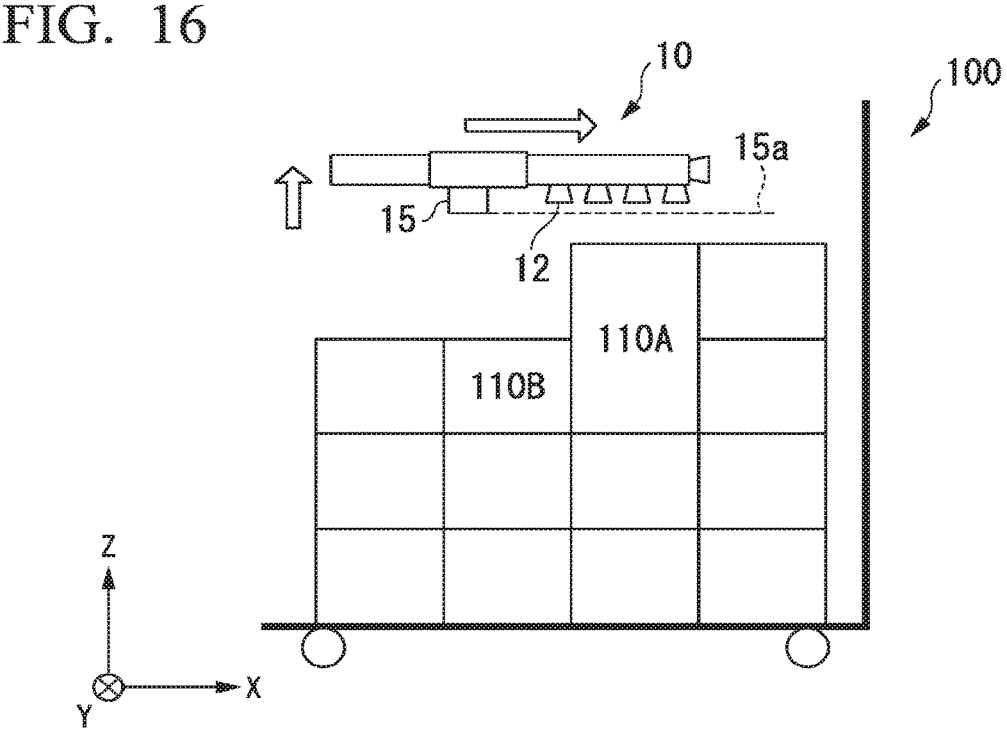
FIG. 16 shows an example of the positioning operation by the transporting apparatus 1 of the first embodiment.
Figure 17:
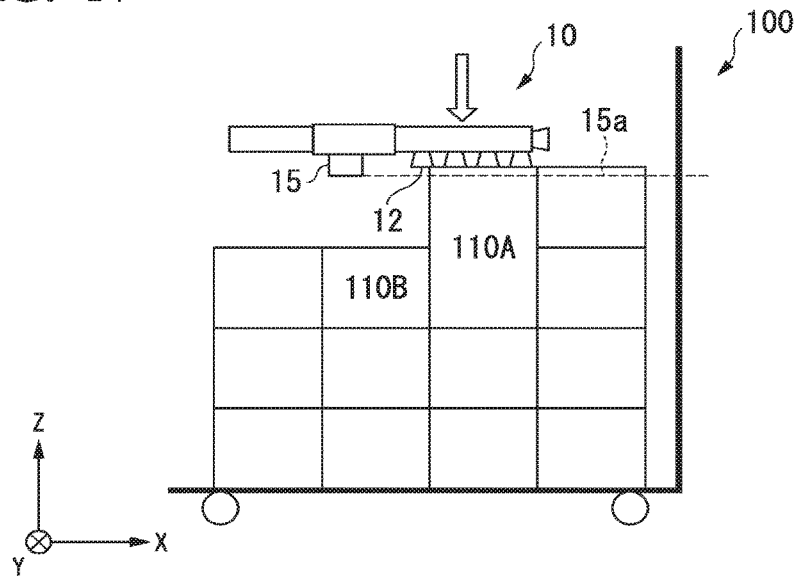
FIG. 17 shows an example of the positioning operation by the transporting apparatus 1 of the first embodiment.

Next, the controller 60 moves the holder 10 up to the holding position (step S106). FIG. 15, FIG. 16, and FIG. 17 show an example of the positioning operation by the transporting apparatus 1 of the first embodiment. The controller 60 moves the holder 10 so that it is at a position higher than the top surface of the transporting object 110A (step 130). Next, the controller 60 moves the holder 10 toward the deep side (+X direction) in the second direction (step S132). Next, the controller 60, based on the distance information transmitted by the first sensor 15, determines whether or not an obstacle has been detected (step S134). If an obstacle, such as shown in FIG. 15, has been detected in the scanning plane 15a, the controller 60 determines that an obstacle has been detected, and moves the holder 10 upward, as shown in FIG. 16 (step S136).

Step S134 and step S136 are in consideration of the possibility that the measurement of the position of the transporting object 110A by the first recognizer 14 and the second recognizer 50 might include an error. That is, at step S130, there is a case in which the holder 10 makes contact with the transporting object 110A if the top surface height position H1 recognized by the first recognizer 14 and the second recognizer 50 is lower than the actual top surface height of the transporting object 110A, and, if the holder 10 is moved to a position that is higher than the top surface height H1 and the holder 10 is moved to the transporting object 110A side in the second direction. With respect to these cases, if an obstacle is detected by the first sensor 15, the controller 60 moves the holder 10 upward, so that, even if the result of recognizing the top surface height position H1 includes an error, contact by the holder 10 with the transporting object 110A can be avoided.

Additionally, the controller 60 may determine whether, as a result of moving the holder 10 upward at step S136, the first sensor 15 detects that the obstacle has gone away. The controller 60 raises the holder 10 until the obstacle is no longer detected, stopping the raising of the holder 10 when the obstacle is no longer detected. If even raising the holder 10 by a prescribed distance does not result in the obstacle no longer being detected, the controller 60 may stop the transporting of the transporting object 110A and start the processing from the recognition of the object 110 (step S100). If there is a large error in the results of recognizing the transporting object 110A, this enables the transporting apparatus 1 to re-start the recognition of the transporting object 110A after stopping the movement of the holder 10.

Although in the first embodiment an obstacle existing in the second direction of the holder 10 within the scanning plane 15a of the first sensor 15 is detected, this is not a restriction. The transporting apparatus 1, instead of an LRF, may be separately provided with a PSD (position-sensitive detector) for detecting an obstacle, and may detect an obstacle within a limited detection range, by shining a light at a prescribed period.

If an obstacle has not been detected or, after moving the holder 10 in the first direction by a prescribed distance, the controller 60 determines whether or not the edge part of the holder 10 in the transport direction has reached the depth-side distance D2 of the top surface of the transporting object 110A (step S138). The controller 60, based on the information of the transporting object 110A, determines whether or not the center of the hand 11 in the Y-axis direction coincides with the center position C of the front of the top surface and also the edge part of the hand 11 in the second direction (+X direction) coincides with the top surface depth-side distance D2, so as to determine whether or not the holder 10 has reached the top surface depth-side distance D2 of the transporting object 110A. If the controller 60 does not determine that the holder 10 has reached the top surface depth-side distance D2 of the transporting object 110A, processing returns to step S132.

If the controller 60 determines that the holder 10 has reached the top surface depth-side distance D2 of the transporting object 110A, it stops the movement of the holder 10 (step S140). Next, the controller 60, as shown in FIG. 17, moves the holder 10 in the vertically downward direction (step S142). When this is done, the controller 60 causes the position of the hand 11 in the vertical direction to coincide with the top surface height position H1 of the transporting object 110A. The transporting apparatus 1 does this to establish the position of the holding plane 10a of the holder 10 so as to be opposite the transporting object 110A.

Next, the controller 60 causes the transporting object 110A to be gripped (step S108. When this is done the suction pads 12 attached to the top surface of the transporting object 110A cause the transporting object 110A to be held by suction. It is desirable that the controller 60 recognizes the top surface region of the transporting object 110A and causes holding of the transporting object 110A by the suction pads 12 that correspond to the top surface region of the transporting object 110A among the plurality of suction pads 12. When this is done, the controller 60 recognizes the suction pads 12 that are opposite to the position and size of the top surface of the transporting object 110A, based on the object width W and the top surface front-side distance D1 and the top surface depth-side distance D2 of the transporting object 110A, and stops the suction by suction pads 12 that are not in contact with the transporting object 110A. This enables an increase in the suction force of the suction pads 12 other than the suction pads 12 that have their suction stopped. It also enables avoidance of the suction of an object 110 neighboring to the transporting object 110A by the suction pads 12.

Next, the controller 60 moves the holder 10 in the vertically upward direction (step S110). Next, the controller 60 moves the supporter 30 to the reference plane (step S112). When this is done, the controller 60 may move the supporter 30 so that the scanning plane 32*a* is at a position in the vertically upper direction by a minute prescribed amount higher than the height H2.

Figure 18:
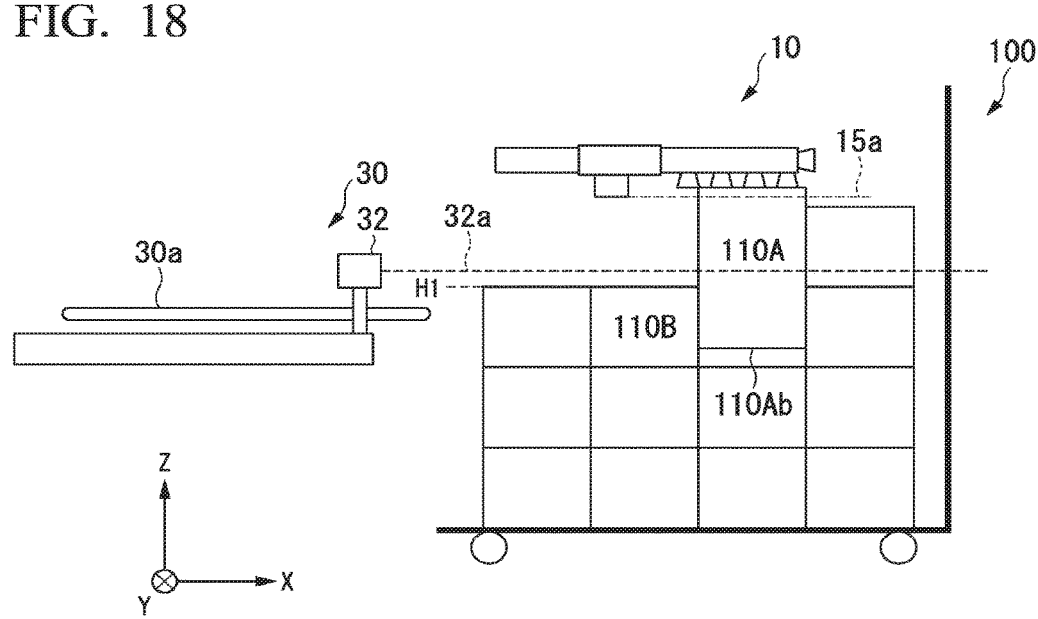
FIG. 18 shows an example of the relationship between the holder 10 and the supporter 30 of the first embodiment.
Figure 19:
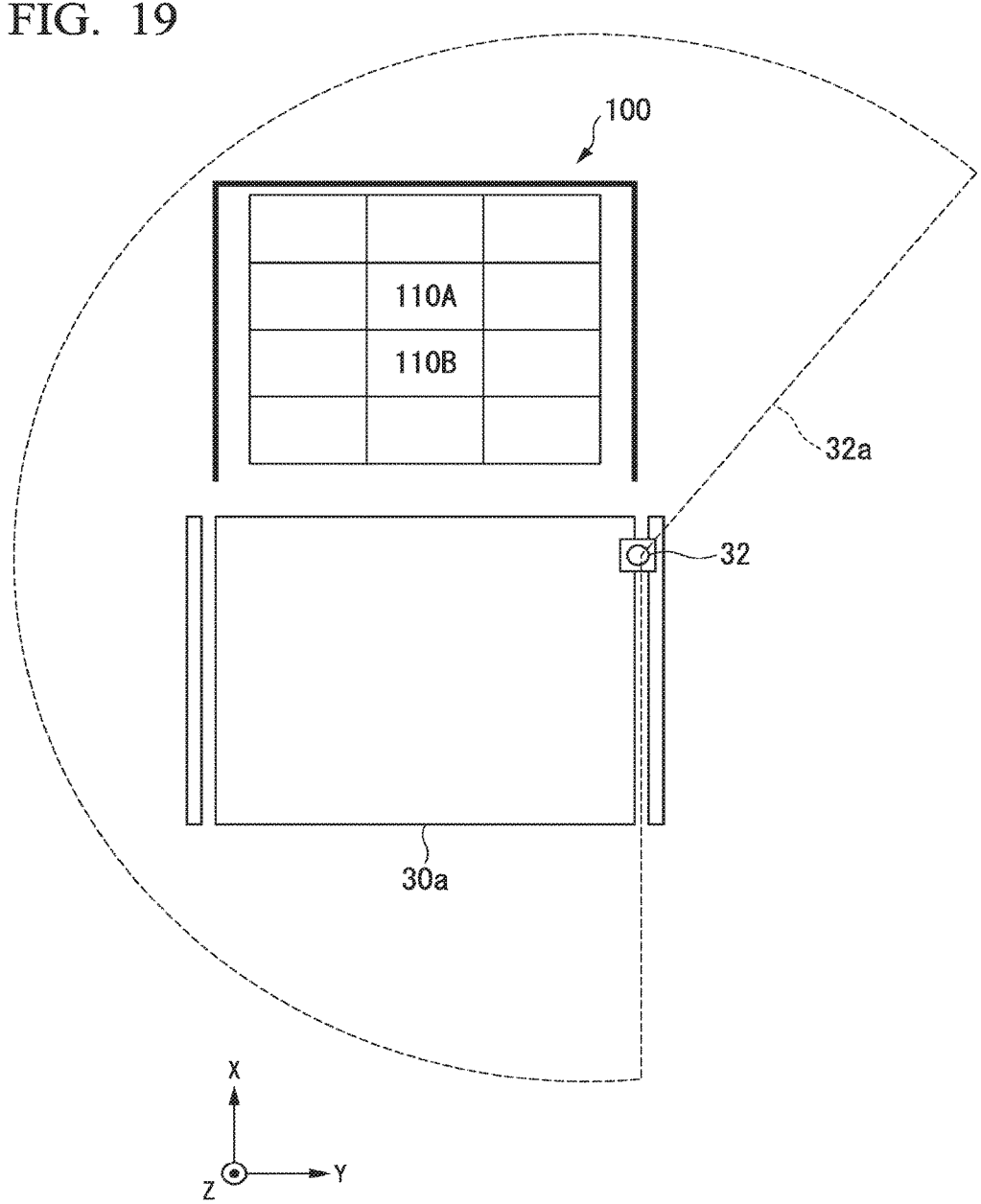
FIG. 19 shows the relationship between the scanning plane 32a and the item 110 of the first embodiment.

FIG. 18 shows an example of the relationship between the holder 10 and the supporter 30 in the first embodiment. FIG. 19 shows the relationship between the scanning plane 32*a* and the object 110 in the first embodiment. Before the holder 10 is moved in the first direction or before the bottom surface 10Ab of the transporting object 110A passes by the top surface height position H1, the controller 60 moves the supporter 30. The controller 60, as shown in FIG. 18, performs positioning of the supporter 30 so that the scanning plane 32*a* of the second sensor 32 is at a position that is higher than the top surface height position H1. The controller 60, as shown in FIG. 19, performs positioning of the supporter 30 in the X-axis direction and the Y-axis direction, so that, with the supporter 30 positioned in the vertical direction, the scanning plane 32*a* in the vertical direction covers the object 110 and the supporting surface 30*a*.

Although in the first embodiment one second sensor 32 causes the scanning plane 32*a* to cover over the object 110 and the supporting surface 30*a*, this is not a restriction. The second sensor 32 may, considering a blind spot, for example, in the object 110, form a scanning plane that covers the object 110 and the supporting surface 30*a* using a plurality of LRFs. Also, in place of the LRFs, the second sensor 32 may form a scanning plane using a separate sensor, such as a three-dimensional distance sensor.

Figure 20:
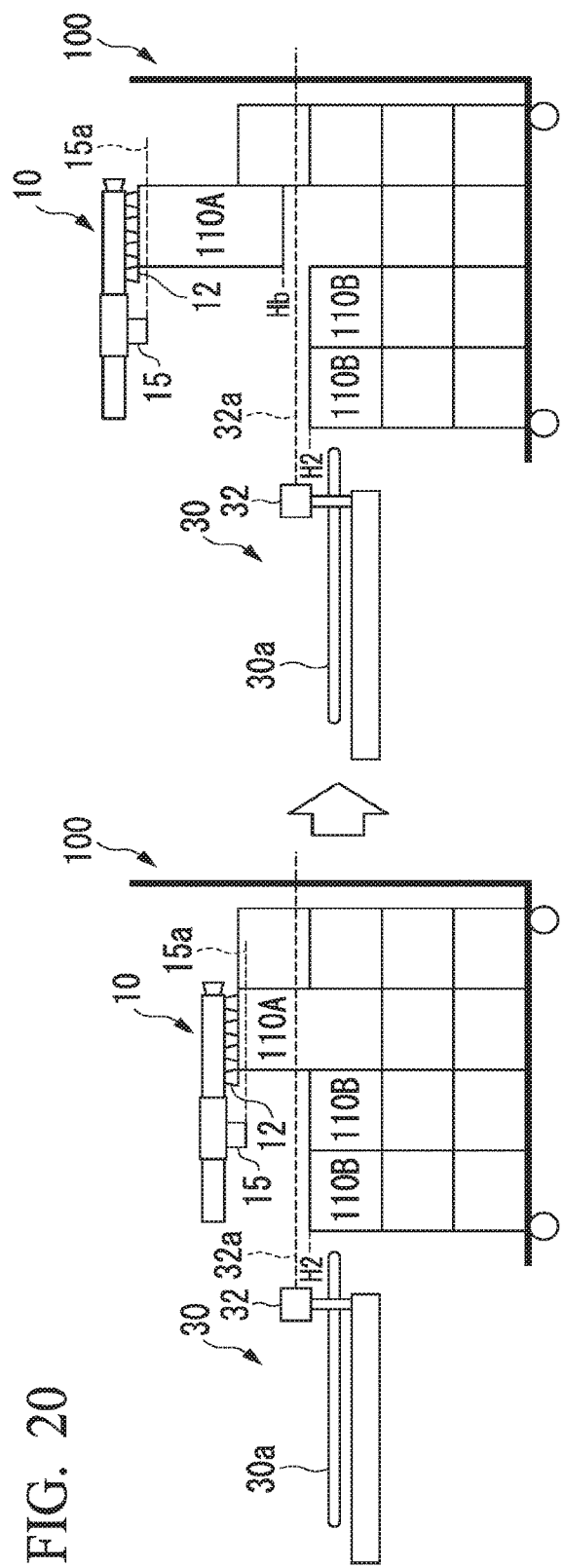
FIG. 20 shows how the transporting object 110A passes the reference plane in the first embodiment.

Next, the controller 60 determines whether or not the bottom surface 110Ab of the transporting object 110A has passed by the reference plane (step S114). If the bottom surface 10Ab of the transporting object 110A has passed by the reference plane, the controller 60 stops the movement of the holder 10 (step S116). FIG. 20 shows how the transporting object 110A passes by the reference plane in the first embodiment. By pulling the holder 10 upward from the state shown at the left in FIG. 20, in which it has gripped the transporting object 110A, the controller 60 pulls up the transporting object 110A as shown at the right in FIG. 20.

Figure 21:
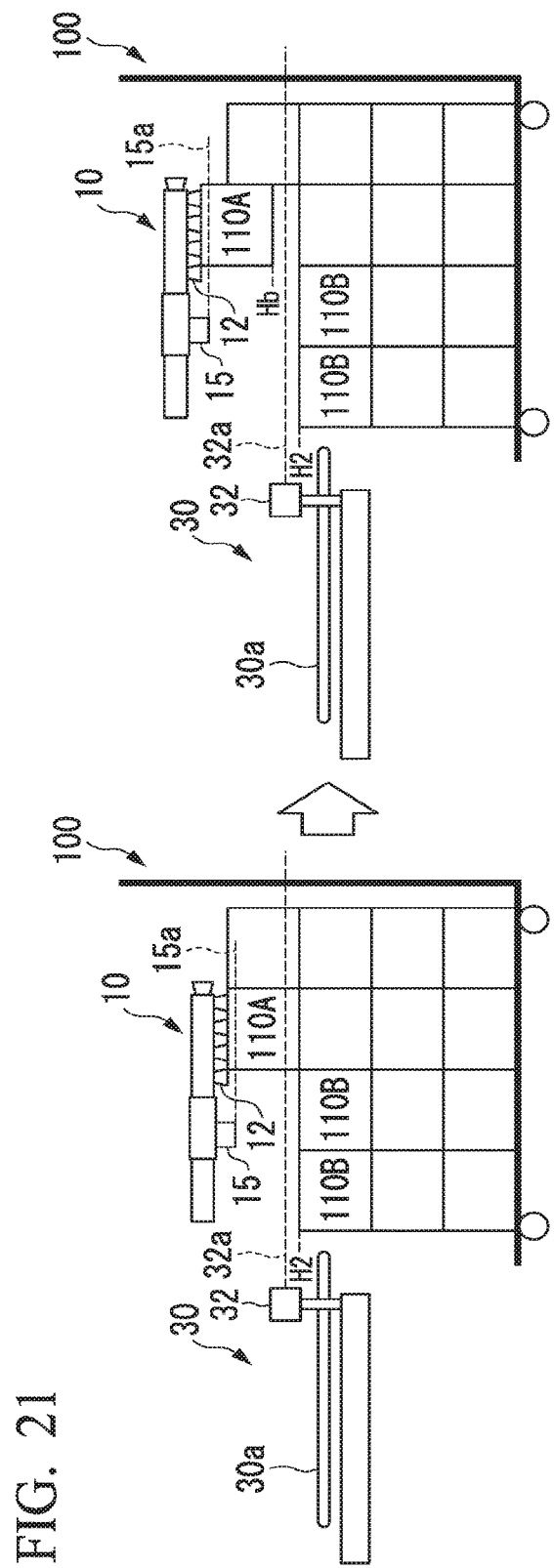
FIG. 21 is another example showing how the transporting object 110A passes the reference plane in the first embodiment.

FIG. 21 shows another example of how the transporting object 110A passes by the reference plane in the first embodiment. By pulling the holder 10 upward from the state, shown at the left in FIG. 21, in which it has gripped the transporting object 110A, the transporting apparatus 1 pulls up the transporting object 110A as shown at the right in FIG. 21. Because the height of the transporting object 110A as shown in FIG. 21 is lower than that of the transporting object 110A shown in FIG. 20, in the state in which the holder 10 pulls the transporting object 110A upward by a tiny distance, it is possible to detect that the height position Hb is higher than the reference plane.

Figure 22:
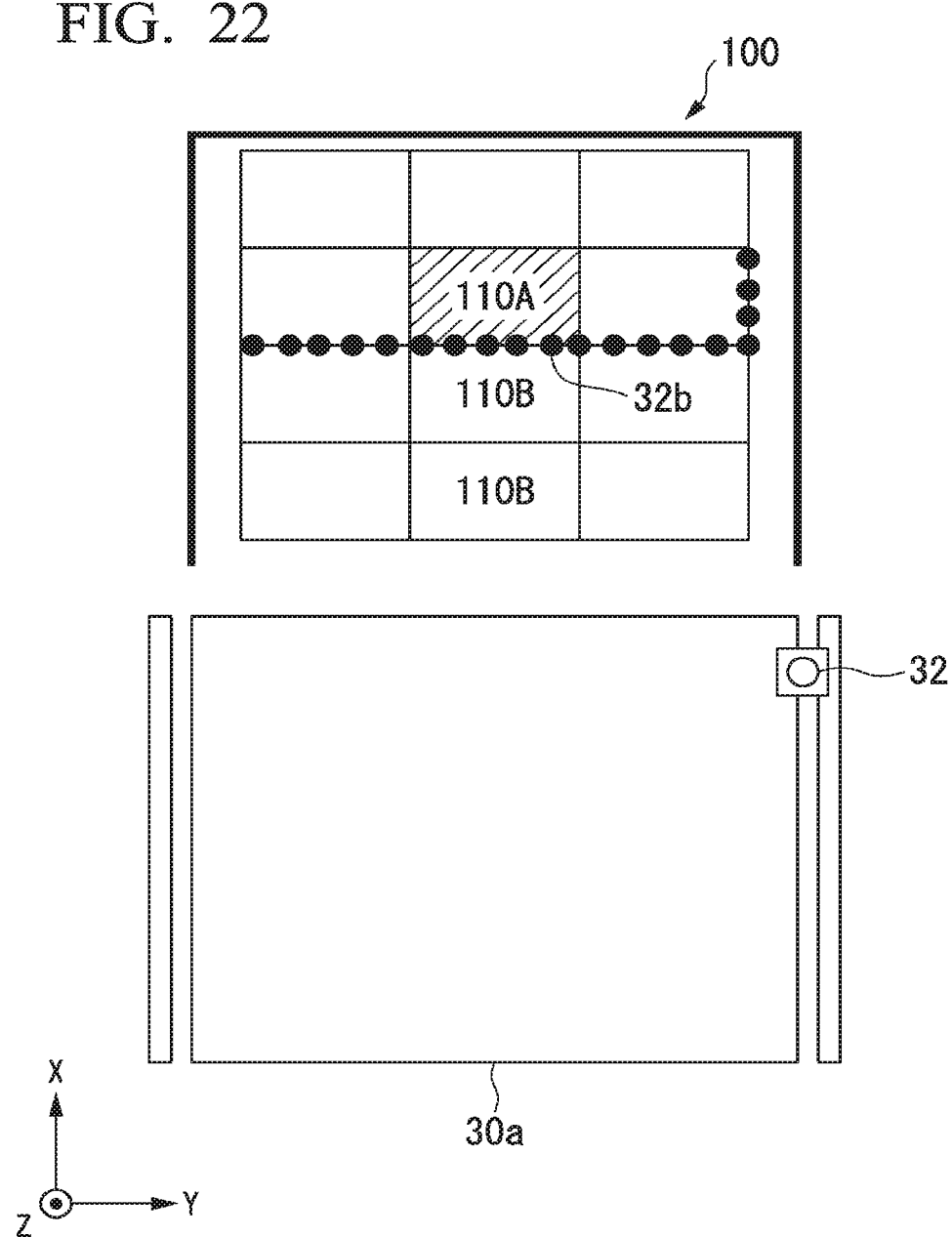
FIG. 22 shows an example of distance information 32b detected by the second sensor 32 of the first embodiment.
Figure 23:
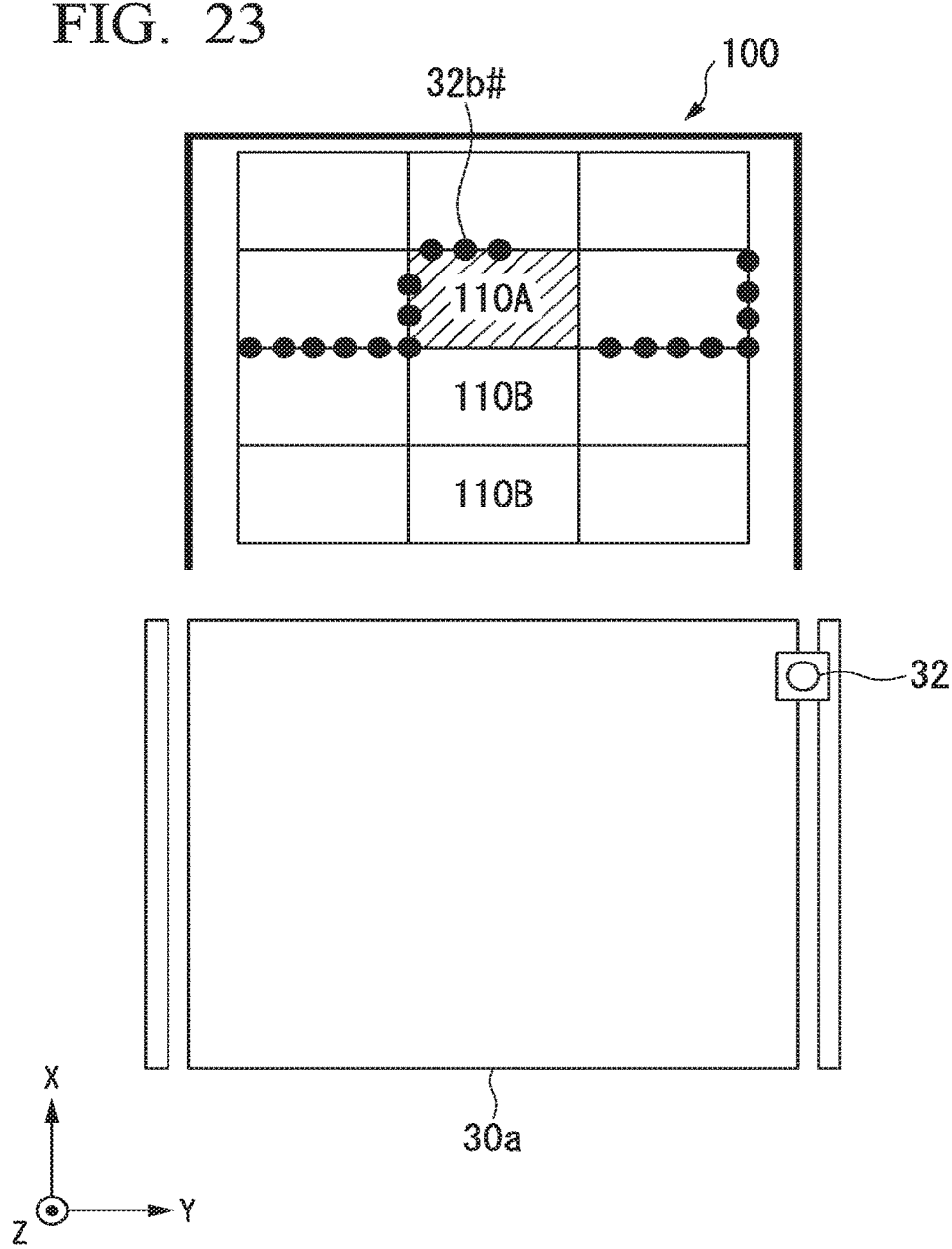
FIG. 23 shows another example of distance information 32b# detected by the second sensor 32 of the first embodiment.

FIG. 22 shows an example of the distance information 32*b* detected by the second sensor 32 in the first embodiment. FIG. 23 shows another example of the distance information 32*b*# detected by the second sensor 32 in the first embodiment. In the state in which the height position Hb has not yet passed by the height position H2, as shown in FIG. 22, if the height position Hb, which detects the distance corresponding to the side surface of the transporting object 110A on the −X direction side as the distance information 32*b*, has passed by the height position H2, the second sensor 32 detects as the distance information 32*b*# the distance corresponding to the side surface of the object 110 on the +X direction side of a position at which the transporting object 110A exists, as shown in FIG. 23. The controller 60, in response to the change in the distance information as noted above, can determine that the height position Hb has passed by the reference plane.

Figure 24:
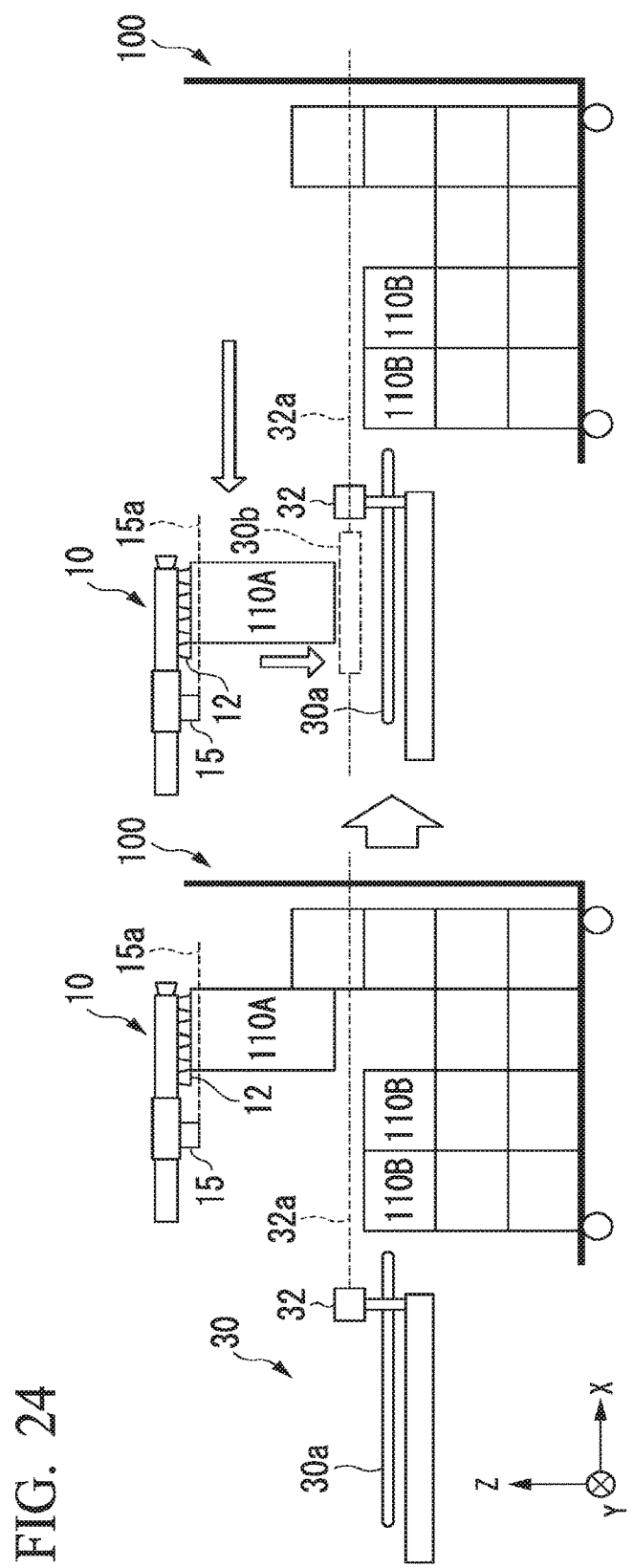
FIG. 24 shows an example of the operation of pulling the transporting object 110A forward in the transporting apparatus 1 of the first embodiment.

Next, the controller 60 transports the transporting object 110A up to the supporting surface 30 (step S118). FIG. 24 shows an example of the operation to pull closer the transporting object 110A in the transporting apparatus 1 of the first embodiment. The controller 60, as shown in FIG. 14, moves the holder 10 horizontally to the supporting surface 30 side (−X direction side) (step S150). When this is done, the controller 60 moves the holder 10 until the bottom surface 110Ab of the transporting object 110A and the supporting surface 30*a* of the supporter 30 overlap in the XY plane. As a result, the transporting object 110A is lifted, from the state shown at the left of FIG. 24, upward from the box pallet 100, until that it is pulled as shown at the right of FIG. 24 closer to the top of the supporter 30.

If the transporting object 110A is pulled closer toward the supporter 30 side, the transporting object 110A does not come into contact with the object 110. As a result, the controller 60 can pull the transporting object 110A closer at the same height from the state in which the transporting object 110A was lifted upward. If the transporting object 110A is to be pulled closer to the supporter 30 side, the controller 60 may monitor contact with the frame of the box pallet 100. The controller 60, based on information transmitted by the first recognizer 14 and the second recognizer 50, monitors the distance between the transporting object 110A and the frame of the box pallet 100. If the distance between the transporting object 110A and the frame of the box pallet 100 is smaller than a prescribed value, the controller 60 horizontally moves the transporting object 110A to the center side of the box pallet 100 in the XY plane. If the shape of the box pallet 100 is known, the controller 60 monitors the amount of movement of the holder 10 and, if the amount of movement of the holder 10 exceeds a prescribed value, horizontally moves the transporting object 110A to the center side of the box pallet 100 in the XY plane.

Next, the controller 60 moves the holder 10 in the vertically downward direction (step S152). This lowers the transporting object 110A to the supporting surface 30*a* side from the state in which, as shown at the right in FIG. 24, it is pulled closer over the supporting surface 30*a*.

In the state in which the transporting object 110A is moved in the vertically downward direction of the holder 10 so as to be transported on the supporter 30, the controller 60 determines whether or not the second sensor 32 has detected the transporting object 110A (step S154). In detecting the lowered transporting object 110A, the detection range for the transporting object 110A is limited to the range 30*b*. The range 30*b* is the range within which the object 110 existing at the reference distance can be detected on the vertically upward side from the supporting surface 30*a*. If the second sensor 32 has not detected the transporting object 110A, the controller 60 repeats the determination made at step S154. If the second sensor 32 has detected the transporting object 110A, the controller 60 stops movement of the holder 10 (step S156). Next, the controller 60 controls the holder 10 so as to release the transporting object 110A (step S158).

If the height position Hb had passed by the reference plane in step S114, the controller 60 may estimate the length of the transporting object 110A in the vertical direction by calculating the difference between the height of the holding plane 10*a* and the height of the scanning plane 15*a*. The controller 60 may set the amount of lowering of the holder 10 based on the estimated length of the transporting object 110A in the vertical direction.

Although the controller 60 may control the amount of lowering of the holder 10 based on the amount of lowering of the gripper based on the estimated length of the transporting object 110A in the vertical direction, this is not a restriction. It is desirable that, if the transporting object 110A is detected by the second sensor 32, the controller 60 stop the lowering of the holder 10. The first reason for this is that an LRF has a finite measurement spot diameter. The second reason is that, because of the influence of the movement offset and communication time of the sampling period and the movement response time, the transporting object 110A is lifted upward to a height position that is higher than the height of the scanning plane of the actual LRF. If the second sensor 32 detects the transporting object 110A, the transporting apparatus 1, by stopping the lowering of the holder 10, ensures that the transporting object 110A falls within a certain distance range from the supporting surface 30a. This enables the transporting apparatus 1 to land the transporting object 110A from a height that is less than a certain height when the transporting object 110A is released.

Additionally, if a landing sensor such as a pressure-sensitive sensor or force sensor the hand 11 or the supporting surface 30a is mounted to the hand 11 or to the supporting surface 30a, the controller 60 may continue to lower the holder 10 until the landing sensor detects landing of the transporting object 110A on the supporting surface 30a. Additionally, if the landing sensor and the second sensor 32 are combined and the second sensor 32 does not detect the transporting object 110A, the controller 60 lowers the holder 10 at a high speed and, if the second sensor 32 detects the transporting object 110A, the controller 60 reduces the speed of lowering the holder 10, and if the landing sensor detects that the transporting object 110A has landed on the supporting surface 30a, the controller 60 stops the lowering of the holder 10.

Additionally, if the transporting object 110A gripped by the holder 10 is a single transporting object 110A, the controller 60 may make the scanning plane 32a larger than the bottom surface of the transporting object 110A. The reason for this is that there are no objects other than the transporting object 110A existing on the supporter 30.

Next, the controller 60 transports the transporting object 110A using the supporter 30 (step S120). This transports the transporting object 110A from the supporter 30 to the conveyor belt 200. When this is done, the supporter 30 moves to the entry height of the conveyor belt 200. After moving the height of the supporting surface 30a to the entry height of the conveyor belt 200, the supporter 30 rotates its own conveyor and feeds the transporting object 110A placed on the supporting surface 30a toward the conveyor belt 200 side. When this occurs, if the transporting object 110A on the supporting surface 30a and the holder 10 or the arm do not make contact, the controller 60, taking into consideration the amount of moving time of the transporting object 110A over the supporting surface 30a, may start the operation of its own conveyor before the supporting surface 30a reaches the height of the conveyor belt 200.

After the holder 10 releases the transporting object 110A, it retreats to a position at which it does not interfere with the released transporting object 110A. As long as the holder 10 does not interfere with the transport of the transporting object 110A by the supporter 30 and the conveyor belt 200, the holder 10 may move for the purpose of holding the next transporting object 110A.

Although the transporting apparatus 1 of the first embodiment transports the transporting object 110A to the conveyer belt 200 via the supporter 30 in order to reduce the risk of dropping the transporting object 110A, this is not a restriction. The transporting apparatus 1 of the first embodiment may eliminate the supporter 30 and transport the transporting object 110A directly on the conveyor belt 200 by the holder 10. In this case, the controller 60 moves the second sensor 32 in the vertical direction by another arm and determines the passing of the reference plane by the transporting object 110A. The controller 60 may dispose a sensor over the conveyor belt 200 and determine that the transporting object 110A has been transported to over the conveyor belt 200.

If the controller 60 determines at step S114 that the bottom surface 110Ab of the transporting object 110A has not passed by the reference plane, it determines whether or not the transporting object 110A has been transported by a reference distance (step S122). The reference distance is, for example, the maximum distance that the holder 10 can be lifted upward. If the controller 60 determines that the transporting object 110A has not been transported by the reference distance, it returns to the processing of step S114. If the controller 60 determines that the transporting object 110A has been transported by the reference distance, it makes a notification (step S124), the transporting apparatus 1 thereby notifying the operator of information regarding a problem or the like.

At this point, if an erroneous recognition or measurement error occurs in the image processing, re-recognition or the like is performed to set the correct position of the object 110, and the operation of lifting the transporting object 110A upward is completed. However, if the transporting object 110A is an object 110 that is longer than the length transportable by the first arm 20, even if a proper position measurement is possible, it is not possible to achieve the operation of pulling out the transporting object 110A. Given this, if it is not possible to achieve the operation of lifting the transporting object 110A upward even if the retry processing from step S100 is repeated a prescribed number of times, the controller 60 determines that the transporting object 110A is an object 110 that is longer than the length transportable in the transporting apparatus 1, in which case the transporting apparatus 1 may stop operation and make a notification.

After making notification, the controller 60 returns to the processing of step S100. By doing this, if the transporting object 110A has been transported by the reference distance in the height direction, the controller 60 measures information of the object 110, including the top surface height position H1 (first information) once again. After that, the transporting apparatus 1 again transports the transporting object 110A in the height direction using the holder 10. By doing this, if it is not possible to set the top surface height position H1 accurately because of erroneous recognition or measurement error in the image processing, and it is impossible to determine that the transporting object 110A has passed by the reference plane, the controller 60 re-measure the top surface height position H1 or the like. Additionally, the controller 60, by re-setting the reference plane based on the re-measured top surface height position H1, can correct the position of the scanning plane 15a of the first sensor 15 in the vertical direction.

As described above, according to the transporting apparatus 1 of the first embodiment, if the change of an object from the first state, in which it is lifted upward in the vertical direction, to the second state, in which it can be transported in the horizontal direction, is detected, the transport of the object in the vertically upward direction is stopped. Specifically, according to the transporting apparatus 1 of the first embodiment, if, based on the top surface height of the objects 110 surrounding the transporting object 110A, the reference plane is set and the transporting object 110A is to be transported in the first direction by the holder 10, the amount of movement of the holder 10 is controlled based on a distance detected by the second sensor 32. By doing this, the transporting apparatus 1, after lifting the transporting object 110A upward to the reference plane, can pull the transporting object 110A toward itself by horizontal movement.

As a result, according to the transporting apparatus 1 of the first embodiment, there is no need to pull by a distance that is longer than the length of the transporting object 110A in the vertical direction, and it is possible to shorten the amount of moving the holder 10, and shorten the transporting time of the transporting object 110A. Also, according to the transporting apparatus 1 of the first embodiment, it is possible to suppress the length of time that the transporting object 110A is suspended in midair, thereby enabling enhancement of transporting safety.

Also, according to the transporting apparatus 1 of the first embodiment, if the holder 10 is controlled so as to transport the transporting object 110A by the reference distance in the first direction, the reference plane is re-set, because the amount of movement of the hand (transporter) 11 is controlled based on the distance between the detection reference point in the re-set reference plane and the transporting object 110A, in a case, for example, in which the reference plane is erroneously set, the transport of the transporting object 110A can be continued, without stopping the apparatus, and the transporting object 110A transporting time can be shortened.

Also, according to the transporting apparatus 1 of the first embodiment, because notification is made when the holder 10 is controlled so as to transport the transporting object 110A by the reference distance in the first direction, based on the distance between the detected reference point in the re-set reference plane and the transporting object 110A, it is possible to make the operator aware of the setting of the apparatus.

Additionally, according to the transporting apparatus 1 of the first embodiment, because the top surface depth-side distance D2 in the second direction of the transporting object 110A is set, and the holder 10 is moved to the top surface of the transporting object 110A based on the top surface depth-side distance D2, it is possible to shorten the positioning time of the holder 10 in the second direction.

Additionally, according to the transporting apparatus 1 of the first embodiment, if the first sensor 15 is provided on the holder 10 and an object is detected by the first sensor 15, because the holder 10 is moved in the first direction, even if there is an error in the result of recognizing the object 110, the transport of the transporting object 110A can be continued, without stopping the machine, and the transporting object 110A transport time can be shortened.

Additionally, according to the transporting apparatus 1 of the first embodiment, a second sensor 32 is provided on the supporter 30. According to the transporting apparatus 1 of the first embodiment, the second sensor 32 is supported and moved by the supporter 30, and the transporting object 110A is caused to be detected, in addition to the reference plane, above the reference plane (scanning plane 32a) over the supporter 30, and the transporting of the transporting object 110A transported to the reference plane is detected. In this case, the transporting apparatus 1 of the first embodiment releases the holding of the transporting object 110A by the holder 10. By doing this, the transporting apparatus 1 of the first embodiment can use the scanning plane 32a for detecting the reference plane and for releasing the hold by the holder 10, thereby simplifying the apparatus.

Additionally, according to the transporting apparatus 1 of the first embodiment, because, of the plurality of suction pads 12, the suction pads 12 that are opposite to the top surface region of the transporting object 110A hold the transporting object 110A, it is possible to increase the holding force of the holder 10.

Although the transporting apparatus 1 of the above-described embodiment detects the passing of the reference symbol by the transporting object 110A using the first sensor 15 (LRF), this is not a restriction. In the embodiment, another method may be used to detect that the transporting object 110A is in a state in which it can be transported in a second direction (for example, horizontally) that intersects with the first direction (vertically upward direction).

The transporting apparatus 1 may detect that the transporting object 110A is in a state in which it is transportable horizontally based on the reflection condition of light that is irradiated onto a first region. The first region is a region in which reflected light can be obtained in the second state, in which the transporting object 110A is not lifted upward, and in which reflected light cannot be obtained in the first state, in which the transporting object 110A is lifted upward. Specifically, the first region is a region set based on the top surface height (H2) of the objects 110B surrounding the transporting object 110A. In this case, the transporting apparatus 1 detects as the reflection condition, the period of time from the shining of the light to the reception of the reflected light (the roundtrip time).

If the transporting object 110A is not lifted upward, as shown at the left in FIG. 20, the transporting apparatus 1 irradiates light on the side surface of the transporting object 110A and receives the reflected light. In the transporting apparatus 1, if the transporting object 110A, as shown at the right in FIG. 20, has been lifted upward, the roundtrip time of the light lengthens. In this case, the transporting apparatus 1 detects that the transporting object 110A is in the state in which it can be transported horizontally.

The transporting apparatus 1 may detect whether or not reflected light has been received within a prescribed period of time after the shining of the light. If the transporting object 110A has been pulled out, if there is no object to reflect the light, it is not possible for the transporting apparatus 1 to receive reflected light within the prescribed period of time from the shining of the light. It the transporting apparatus 1 cannot receive reflected light within the prescribed period of time from the shining of the light, the transporting apparatus 1 detects that the transporting object 110A is in the state in which is can be transported horizontally.

The transporting apparatus 1 may detect a change of a phase of reflected light as the reflection condition of light. If the transporting object 110A is not lifted upward, the transporting apparatus 1 detects the phase of reflected light. In the transporting apparatus 1, if the transporting object 110A has been lifted upward, the transporting apparatus 1 detects a change of the phase of reflected light.

The transporting apparatus 1 may detect that the transporting object 110A is in the state in which it can be transported horizontally based on a characteristic value of a first image captured of the second region. The second region is a region in which the image of the side surface of the transporting object 110A in the first state, in which the transporting object 110A has not been lifted upward, can be captured, and in which the bottom surface of the transporting object 110A in the second state, in which the transporting object 110A has been lifted upward, can be captured. The second region is a region that includes the side surface of the transporting object 110A further above the top surface height of the objects 110B surrounding the transporting object 110A in the vertically upward direction. This region is set based on the top surface height (H2) of the objects 110B surrounding the transporting object 110A. The transporting apparatus 1, for example, in place of the second sensor 32, is provided with a camera apparatus 32A, so as to image the vicinity of the border between the transporting object 110A and the objects 110B there surrounding. FIG. 25 shows another example of the transporting apparatus 1 of the first embodiment.

The transporting apparatus 1 may acquire the image characteristic value by performing edge detection processing with respect to the captured image. If the characteristic value has changed, the transporting apparatus 1 detects that the transporting object 110A is in a state in which it can be transported horizontally. The transporting apparatus 1 may detect a change in the characteristic value that represents the edge of the transporting object 110A in the vertically downward direction from a characteristic value that represents the boundary between the transporting object 110A and the top surfaces of the objects 110B.

In order to emphasize the shadow at the edges of the transporting object 110A and the objects 110B, the transporting apparatus 1 may have a supplementary light source. This enables the transporting apparatus 1 to increase the sensitivity of edge detection.

Additionally, in the state in which light is projected onto a third region, the transporting apparatus 1 may capture an image in the third region. The third region is a region in which projected light can be imaged both in the first state, in which the transporting object 110A has not been lifted upward, and in the second state, in which the transporting object 110A has been lifted upward. The third region is, for example, a region that includes the side surface the transporting object 110A that is vertically above the top surface of height of the objects 110B surrounding the transporting object 110A. FIG. 26 shows another example of the transporting apparatus 1 of the first embodiment. The transporting apparatus 1, for example, has a projector 32B that can be transported in the vertical direction. If the top surface of an object 110B is recognized, the projector 32B projects light in a region that includes the side surface of the transporting object 110A vertically above the top surface height of the object 110B.

The transporting apparatus 1 irradiates projected light onto the third region of the side-surface of the transporting object 110A. In the state in which the transporting object 110A has not been pulled out, such as shown at the left of FIG. 26, the transporting apparatus 1 projects, for example, a circular light in the third region. If the transporting object 110A has been pulled out, as shown at the left in FIG. 26, the circular projected light is distorted. If the characteristic value of the image changes, the transporting apparatus 1 detects that the transporting object 110A is in a state in which it can be transported horizontally.

Additionally, the transporting apparatus 1 may, based on a space formed by at least the transporting object 110A and objects surrounding the transporting object 110A, detect the state in which the transporting object 110A can be transported horizontally. The transporting apparatus 1, as shown in FIG. 25, has a camera apparatus 32A and calculates the distance in the depth direction by the camera apparatus 32A. The transporting apparatus 1, based on the distance in the depth direction, calculates the volume of the space formed below the transporting object 110A in the vertically downward direction from the bottom surface. The transporting apparatus 1 calculates the volume of the space based on, for example, the distance in the depth direction, the width of the bottom surface of the transporting object 110A, and the width of the object 110B at the top surface height of the object 110B.

In the state, as shown at the left in FIG. 25, in which the transporting object 110A has not been pulled out, the transporting apparatus 1 determines that there is no space. If the transporting object 110A has been pulled out, as shown at the right in FIG. 25, a space appears at the bottom surface of the transporting object 110A. This enables the transporting apparatus 1 to detect that the volume of the space at the bottom surface of the transporting object 110A has changed.

Additionally, the transporting apparatus 1, based on the surface area of the side surface 110a of the transporting object 110A that is exposed without being hindered by objects surrounding the transporting object 110A, detects that the transporting object 110A is in the state in which it can be transported horizontally. FIG. 27 shows another example of the transporting apparatus 1 of the first embodiment. It is desirable that the camera apparatus 32A have a picture angle that enables imaging of an object 110 having the maximum dimensions expected to be transported in the transporting apparatus 1.

The transporting apparatus 1 detects the surface area of the side surface 110a of the transporting object 110A. The transporting apparatus 1, as shown at the left in FIG. 27, during the transporting of the transporting object 110A vertically upward, gradually increases the surface area of the side surface 110a of the transporting object 110A. If the transporting object 110A has been pulled out, as shown at the right in FIG. 27, the transporting apparatus 1 changes to the state in which the surface area of the side surface 110a of the transporting object 110A is not increasing, in which case the transporting apparatus 1 detects that the transporting object 110A is in the state in which it can be transported horizontally.

Second Embodiment

A transporting apparatus 1 and a transporting method of the second embodiment will now be described. In the description of the second embodiment, elements that are the same as those in the first embodiment are assigned the same reference symbols, and the detailed descriptions thereof will be omitted.

Figure 28:
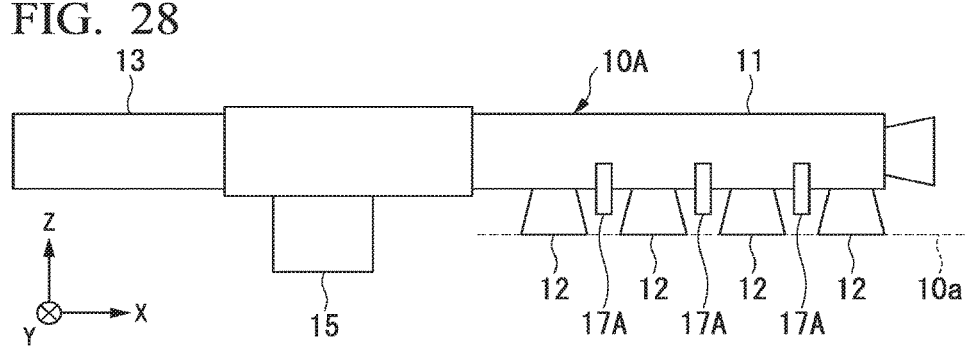
FIG. 28 shows an example of the holder 10A in a second embodiment.
Figure 29:
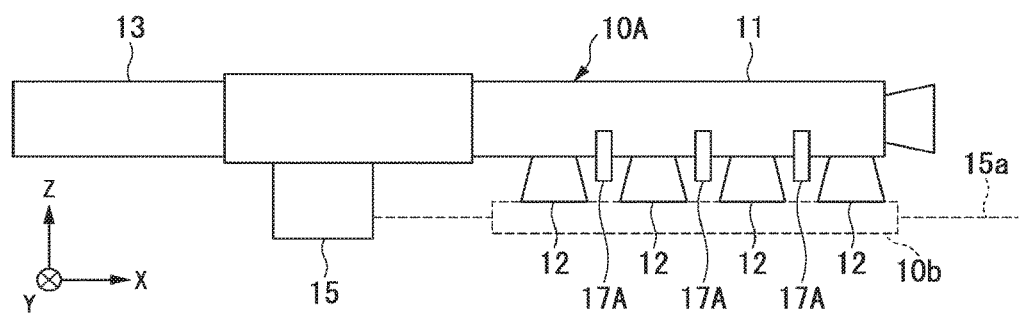
FIG. 29 shows an example of the detection range 10b of the object 110 in the holder 10A in the second embodiment.

The transporting apparatus 1 of the second embodiment differs from the transporting apparatus 1 of the first embodiment in that it determines that the transporting object 110A is gripped by the holder 10A and transports the transporting object 110A. FIG. 28 shows an example of the holder 10A in the second embodiment. FIG. 29 shows an example of the detection range 10b of an object 110 in the holder 10A in the second embodiment.

The holder 10A includes third sensors 17A, provided between the suction pads 12. Although the third sensors 17A are pressure sensors that detect the pressure applied to the suction pads 12, this is not a restriction. The third sensors 17A may be optical distance sensors that include a light source and a light receiver. The third sensors 17A detect an object 110 existing in a direction that intersects with the vertical direction from the holding plane 10a. The third sensors 17A, as shown in FIG. 29, are set so that a tiny distance in the downward direction from the holding plane 10a is the detection range 10b for an object 110. The third sensors 17A transmit the results of detecting an object 110 to the controller 60. Although a plurality of third sensors 17A are provided between the suction pads 12, this is not a restriction, and there may be only one thereof.

Figure 30:
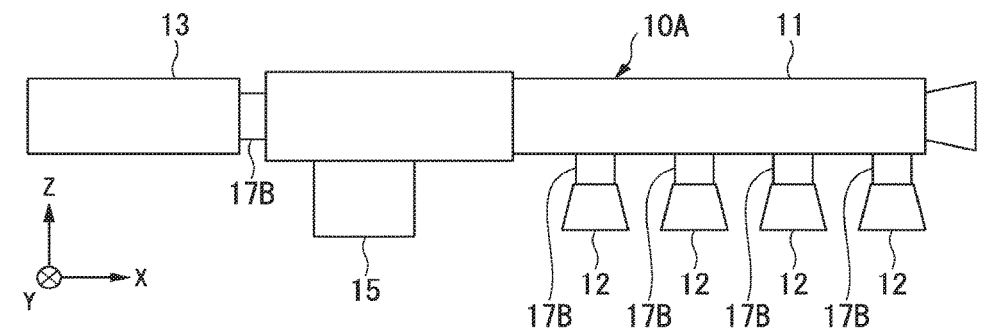
FIG. 30 shows another example of the holder 10A in the second embodiment.

The third sensors 17A in the second embodiment may be force sensors. FIG. 30 shows another example of the holder 10A in the second embodiment. Force sensors 17B are provided between the hand 11 and the suction pads 12 as the third sensors. The force sensors 17B detect and transmit to the controller 60 a value corresponding to a pulling force or moment applied to the suction pads 12. Although the installation positions of the force sensors 17B are between the hand 11 and the suction pads 12, this is not a restriction, and they may be locations at which a force is applied that changes when the holder 10A grips the transporting object 110A, such as between the hand 11 and the linking section 13.

Figure 31:
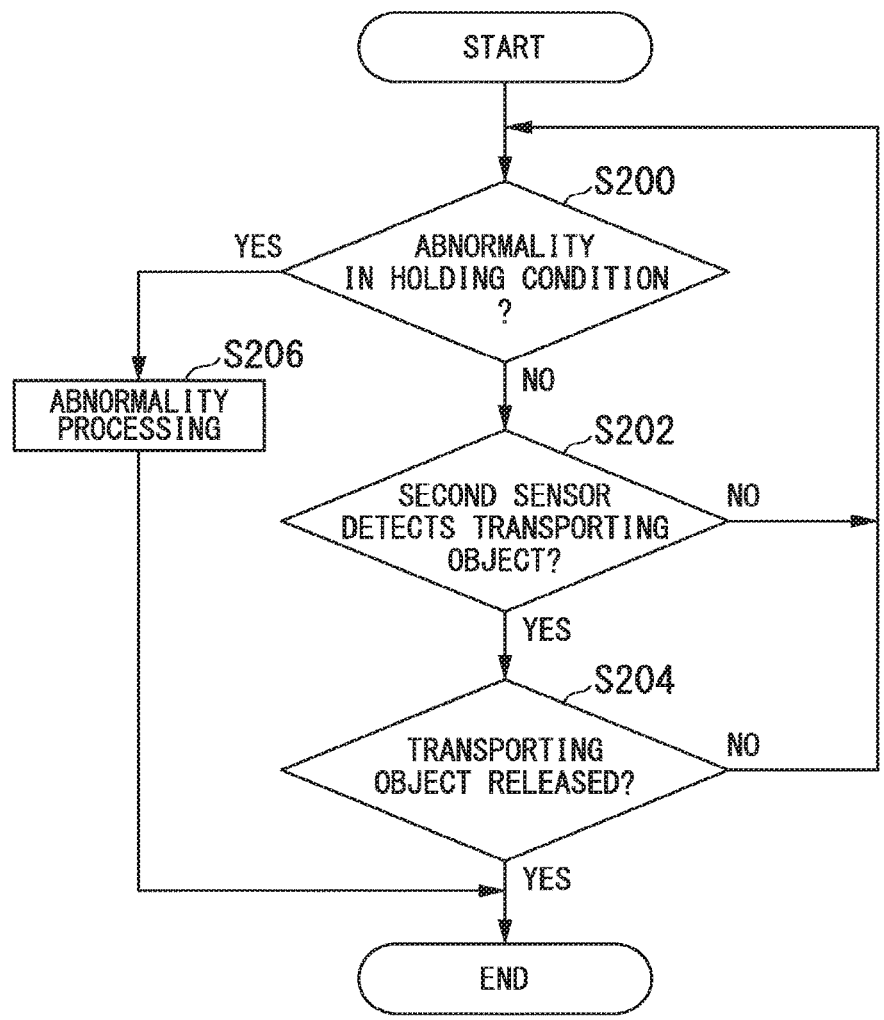
FIG. 31 is a flowchart showing the flow of processing when the holder 10A is holding the transporting object 110A in the transporting apparatus 1 of the second embodiment.

FIG. 31 is a flowchart showing the flow of processing in the case in which the holder 10A is holding the transporting object 110A in the transporting apparatus 1 of the second embodiment. If the controller 60 performs control at step S108 in FIG. 11 so that the holder 10A grips the transporting object 110A, the processing of FIG. 31 is executed. In the description to follow, the third sensors 17A and 17B will be referred to collectively as the third sensor 17, and the sensor value detected by the third sensor 17 will include a value corresponding to a pressure value, a pulling force, or moment.

The controller 60 determines whether or not the condition of holding by the holder 10A is abnormal (step S200). At step S200, the controller 60 receives a sensor value detected by the third sensor 17 and recognizes a suction pad 12 for which the received sensor value changed by at least a prescribed value from the pressure value at the time of completion of the holding of the transporting object 110A. The controller 60 determines whether or not the proportion suction pads 12 of the plurality of suction pads 12 for which the sensor value changed at least the prescribed value has reached a threshold. If the controller 60 determines that there is no abnormality in the condition of the holding by the holder 10A, it determines whether or not the second sensor 32 has detected the transporting object 110A (step S202). If the second sensor 32 has not detected the transporting object 110A, the controller 60 returns to the processing of step S200.

If the controller 60 determines that the second sensor 32 has detected the transporting object 110A, it determines whether or not the transporting object 110A has been released by the holder 10A (step S204). If the controller 60 determines that the transporting object 110A has not been released by the holder 10A, it returns to the processing of step S200, and if it determines that the holder 10A has released the transporting object 110A, it ends the processing.

If the controller 60 determined that there has been an abnormality in the condition of the holding by the holder 10A, it executes abnormality processing (step S206). Although an example of the abnormality processing is execution of retry processing by the controller 60, this is not a restriction. In the retry processing, the controller 60, after moving the holder 10A to the position at which the holding of the transporting object 110A was completed, causes an operation so as to release the transporting object 110A. After completion of the abnormality processing, the controller 60 completes the processing and starts the processing from step S100, so as to execute the processing to transport the transporting object 110A once again. In addition to the retry processing, the transporting apparatus 1 may, as the abnormality processing, notify the operator of the abnormality, rather than performing retry processing.

As described above, according to the transporting apparatus 1 of the second embodiment, third sensors 17 are provided in the holder 10A and, if an object is not detected by the third sensors 17, the reference plane is re-set and the transporting object 110A is again transported in the first direction by the holder 10A. This enables the transporting apparatus 1 of the second embodiment to transport the transporting object 110A again even if the holding thereof by the holder 10A fails.

Third Embodiment

A transporting apparatus 1 and a transporting method of the third embodiment will now be described. In the description of the third embodiment, elements that are the same as those in the above-described embodiments are assigned the same reference symbols, and the detailed descriptions thereof will be omitted. The transporting apparatus 1 of the third embodiment differs from the transporting apparatus 1 of the above-described embodiments in that, if it is possible for the holder 10A to grip a plurality of the transporting objects 110A, it transports a plurality of transporting objects 110A.

Figure 32:
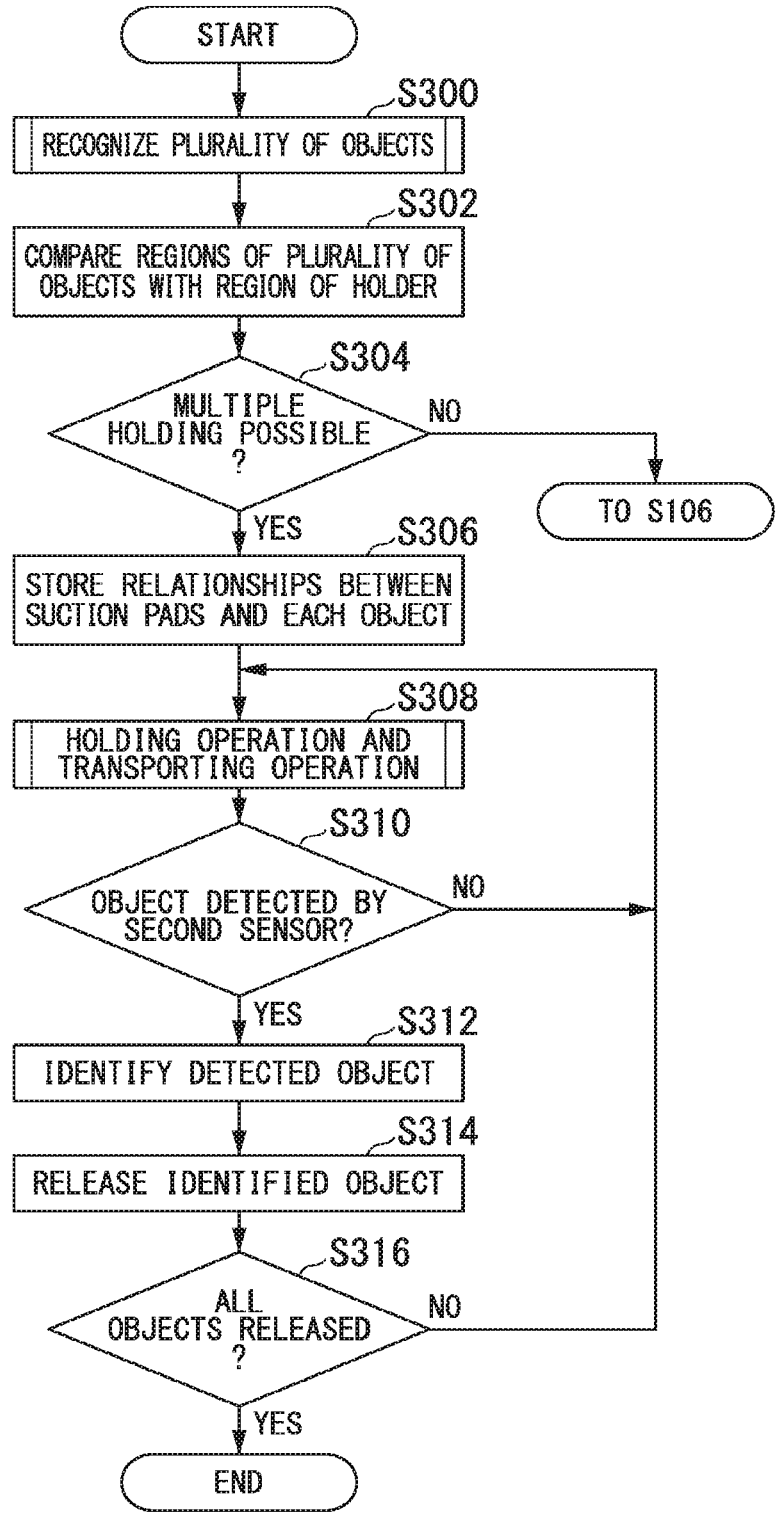
FIG. 32 is a flowchart showing an example of the transporting operation in a third embodiment.

FIG. 32 is a flowchart showing an example of the transporting operation in the third embodiment. First, the controller 60 recognizes the region of a plurality of objects 110 stacked in the box pallet 100 (step S300). Although the processing of step S300 may include the processing of the above-described step S100 to step S104 in FIG. 11, this is not a restriction. Next, the controller 60 compares the region formed by the plurality of recognized objects 110 and the region formed by the holding plane 10a in the holder 10 (step S302). Although the region formed by the plurality of objects 110 is the top surface region, and the region formed by the holding plane 10a is a region on a plane parallel to the XY plane, these are not restrictions.

Figure 33:
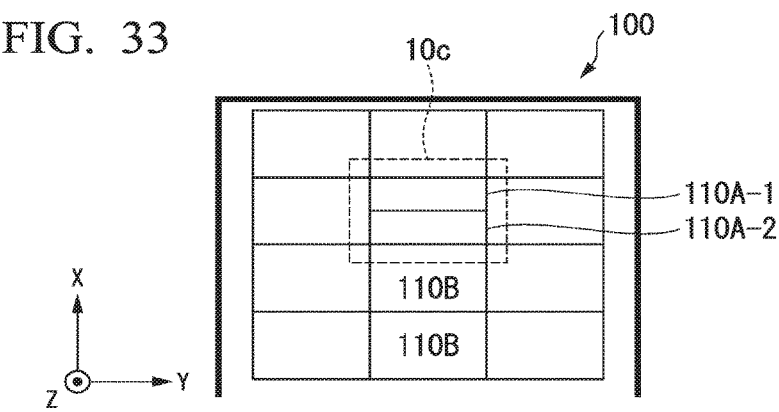
FIG. 33 shows the relationship between the region 10c formed by the holding plane 10a and the region formed by the transporting objects 110A-1 and 110A-2 in the third embodiment.

Next, based on the result of comparing the region formed by the plurality of objects 110 and the region formed by the holding plane 10a, the controller 60 determines whether or not the holder 10 can grip the plurality of objects 110 (step S304). FIG. 33 shows the relationship between the region 10c formed by the holding plane 10a and the region formed by the transporting objects 110A-1 and 110A-2 in the third embodiment. The region 10c formed by the holding plane 10a is the region of the surface of the plane projected from the +Z direction side onto the object 110 when the holder 10A is disposed vertically upward from the object 110.

For example, the controller 60 determines as an object 110 that can be gripped by the holder 10 an object 110, at least a certain proportion of the top surface of which is included into the region 10c formed by the holding plane 10a in the XY plane, and also the top surface height of which is included in the movable range of the holder 10 in the vertical direction. If the contacting parts that contact the object 110 are the suction pads 12, the transportable region in the vertical direction of the holder 10 is the extension and compression range of the bellows thereof. The controller 60 selects the object 110 having the highest top surface at the highest position within an arbitrarily set XY plane as the first candidate. Next, the controller 60, from among the objects 110 existing within a certain distance from the first candidate object 110 in the vertical direction, sets as the second candidate object 110 having a top surface height that is the next highest after the first candidate object 110.

The controller 60, by comparing the positions of the plurality of transporting objects 110A-1 and 110A-2 and the region 10c formed by the holding plane 10a, determines that the region corresponding to the plurality of transporting objects 110A-1 and 110A-2 are included in the region 10c corresponding to the holding plane 10a. By doing this, the controller 60 determines that the plurality of transporting objects 110A-1 and 110A-2 can be gripped by the holder 10. If the controller 60 determines that the plurality of objects 110 cannot be gripped by the holder 10, it proceeds to the processing of step S106 in FIG. 11, transitioning to the operation of transporting one transporting object 110A.

If the controller 60 determines that the plurality of transporting objects 110A-1 and 110A-2 can be gripped by the holder 10, it stores the relationship between the suction pads 12 and the transporting objects 110A-1 and 110A-2 into the storage 62 (step S306). When this is done, the controller 60 stores the suction pads 12 that hold the transporting objects 110A for each of the transporting objects 110A. The controller 60 references the object 110 information stored in the storage 62, searches for the holding position at which a transporting object 110A fits into the holding plane 10a most efficiently, and makes a setting so that the holding plane 10a is positioned vertically above the first candidate object 110.

Figure 34:
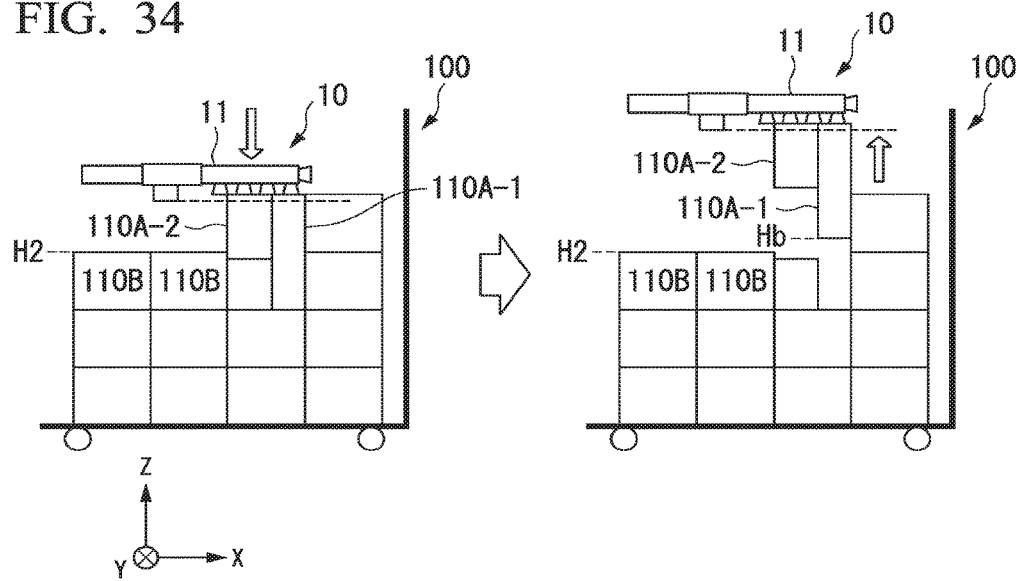
FIG. 34 shows an example of the operation of the transporting apparatus 1 lifting up a plurality of transporting objects 110A-1 and 110A-2 in the third embodiment.

Next, the controller 60 causes the holder 10 to grip the plurality of transporting objects 110A-1 and 110A-2 and causes the transporting of the plurality of transporting objects 110A-1 and 110A-2 by the holder 10 (step S308). FIG. 34 shows an example of the operation of the transporting apparatus 1 of the third embodiment lifting the plurality of transporting targets objects 110A-1 and 110A-2 upward. The controller 60 causes the holder 10 to grip the plurality of transporting targets objects 110A-1 and 110A-2 as shown at the left of FIG. 34. The controller 60 lifts the plurality of transporting targets objects 110A-1 and 110A-2 until the bottom surface height position Hb of the transporting objects 110A-1 and 110A-2 passes the reference plane, as shown at the right of FIG. 34. When this is done, the controller 60 acquires length information of the plurality of transporting objects 110A-1 and 110A-2 in the vertical direction. For example, the controller 60 acquires, as the information of the length in the vertical direction, information indicating that the length of the transporting object 110A-1 of the plurality of transporting objects 110A-1 and 110A-2 is longer in the vertical direction. After that, the controller 60 moves the holder 10 so as to transport the plurality of transporting objects 110A-1 and 110A-2 toward the vertically upward side from the supporting surface 30a.

In this case, when lifting up the transporting objects 110A-1 and 110A-2, the controller 60 sets the position of the scanning plane 15a of the first sensor 15 in the vertical direction to the height position of the higher of the transporting objects 110A-1 and 110A-2. If all of the gripped objects 110 have passed by the reference plane, the controller 60 ends the operation of pulling the objects 110 upward.

Next, the controller 60 determines whether or not the second sensor 32 has detected an object 110 (step S310). The controller 60 identifies the object 110 detected by the second sensor 32 (step S312). When this is done, the controller 60, based on the information of the lengths of the plurality of transporting objects 110A-1 and 110A-2 in the vertical direction, identifies the transporting object 110A-1 as the object 110 that has been lowered down to the range 30b.

Next, the controller 60 controls the holder 10 so as to release the transporting object 110A-1 that has been identified at step S312 (step S314). When this is done, the controller 60 performs control so as to reduce the suction force of the suction pads 12 opposite the identified transporting object 110A-1. The controller 60 performs control so as to maintain the suction force of the suction pads 12 other than the ones opposite the identified transporting object 110A-1. The controller 60 may, based on the sizes of the plurality of transporting objects 110A-1 and 110A-2, adjust the size of the range 30b for detecting an object 110.

Next, the controller 60 determines whether or not the holder 10 has released all of the transported objects 110 (step S316). If the holder 10 has not released all of the objects 110, the controller 60 returns processing to step S308, and if the determination is made that all the objects 110 have been released, it ends the processing.

Figure 35:
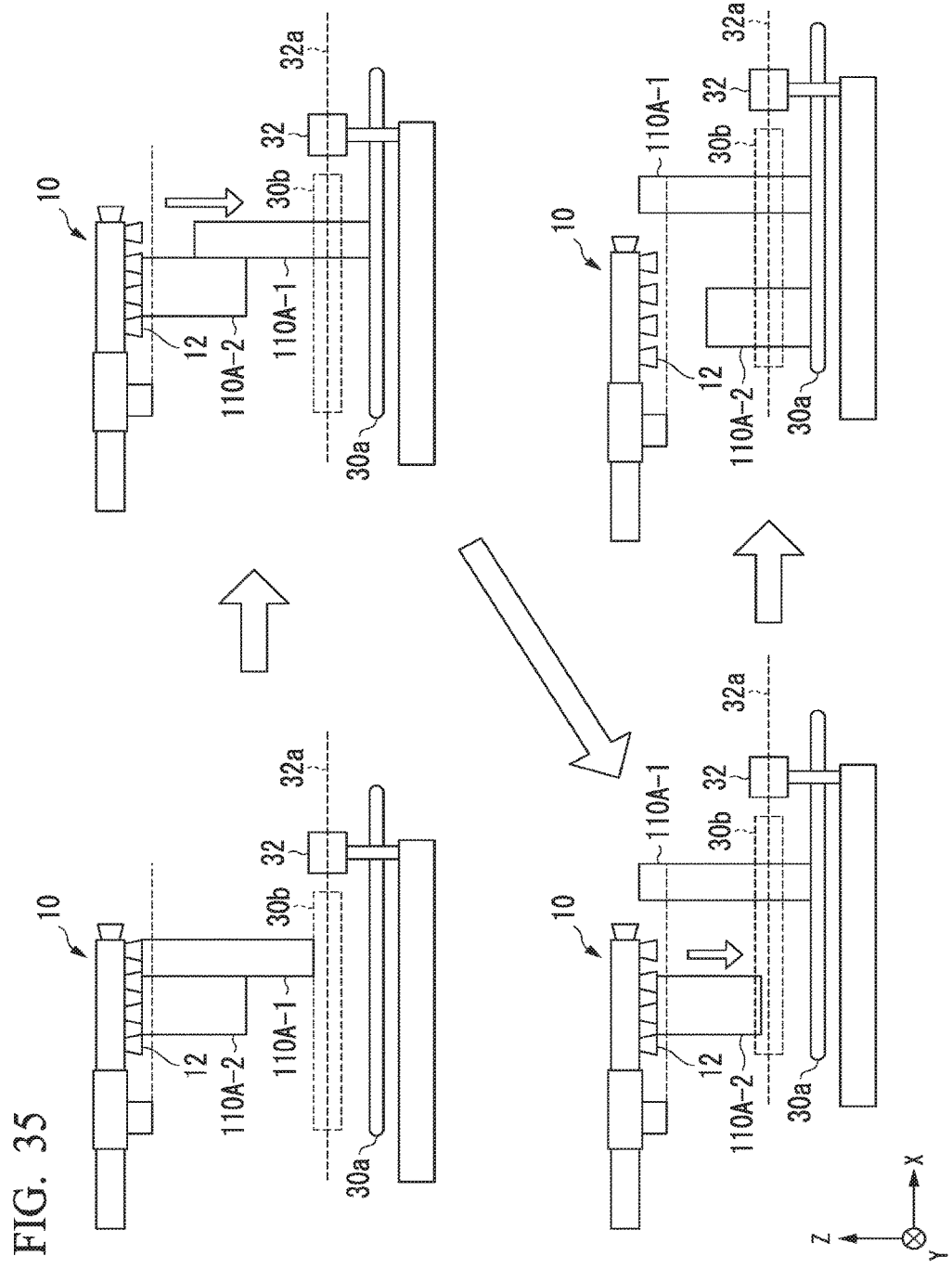
FIG. 35 shows an example of the operation of releasing the plurality of transporting objects 110A-1 and 110A-2 in the third embodiment.

FIG. 35 shows an example of the operation of releasing the plurality of transporting objects 110A-1 and 110A-2 in the third embodiment. If the transporting object 110A-1 has been lowered down to the range 30b, as shown at the upper-left in FIG. 35, the controller 60 identifies the object 110 that has been lowered down to the range 30b as the transporting object 110A-1. The controller 60 then causes the suction pads 12 opposite the transporting object 110A-1 to release their hold, so that, as shown at the upper-right in FIG. 35, the transporting object 110A-1 lands on the supporting surface 30a. After that, the controller 60 moves the holder 10 horizontally so that it does not interfere with the transporting object 110A-1 and moves the holder 10 vertically downward. If the transporting object 110A-2 has been lowered to the range 30b, as shown at the lower-left in FIG. 35, the controller 60 identifies the object 110 lowered to the region 30b as the transporting object 110A-2. Then, the controller 60 causes the suction pads 12 opposite the transporting object 110A-2 to release their hold, so that, as shown at the lower-right in FIG. 35, the transporting object 110A-2 lands on the supporting surface 30a. Although transporting apparatus 1 of the third embodiment transports two transporting objects 110A, this is not a restriction. The transporting apparatus 1 of the third embodiment may transport three or more transporting objects 110A.

As described above, according to the transporting apparatus 1 of the third embodiment, the top surface regions of each of a plurality of transporting objects 110A are set and, based on each of the top surface regions of the transporting objects 110A, the suction pads 12 holding each of the transporting objects 110A are identified, and the identified suction pads 12 are caused to hold each of the transporting objects 110A. Also, according to the transporting apparatus 1 of the third embodiment, if the transporting of a transporting object 110A to the scanning plane 32a is detected, the transporting object 110A held by the holder 10 is identified, and the holding of the identified transporting object 110A by the suction pads 12 is released. By doing this, the transporting apparatus 1 of the third embodiment can transport the transporting object 110A with one movement, and can shorten the time for transporting a plurality of objects.

According to at least one embodiment described above, by having a transporter that, after holding an selected object from among a plurality of objects and transport the selected object in a first direction in a first state and then transporting the selected object, while holding the selected object, in a second direction different from the first direction and not anti-parallel to the first direction, in a second state, a detector detecting a change from the first state to the second state, wherein, in the second state, the transporter can transport the selected object in the second direction without disturbance by the presence of any other object than the selected object; and a controller stopping transporting the selected object in the first direction, in case that the detector detected the change from the first state to the second state, the amount of movement of the transporter can be shortened, thereby shortening the time for transporting the selected object.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transporting apparatus, comprising:
   a transporter configured to hold a selected object from among a plurality of objects and transport the selected object in a first direction in a first state, and then configured to transport the selected object, while holding the selected object, to a second direction different from the first direction, in a second state;
   a plurality of detectors configured to detect a change from the first state to the second state; and
   a controller configured to stop transporting the selected object in the first direction in case that the plurality of detectors detect the change from the first state to the second state, wherein
   in the second state, the transporter transports the selected object in the second direction without disturbance by a presence of any other object than the selected object.

2. The transporting apparatus according to claim 1, wherein at least one of the plurality of detectors irradiates an irradiating light onto the plurality of objects and receives a reflected light from a side surface of the selected object, to detect the change from the first state to the second state based on a change in a reflection condition.

3. The transporting apparatus according to claim 2, wherein the at least one of the plurality of detectors detects a time period from a first time at which the irradiating light is irradiated to a second time at which the reflected light is received.

4. The transporting apparatus according to claim 2, wherein the at least one of the plurality of detectors detects a phase difference between the light and the reflected light as the reflection condition.

5. The transporting apparatus according to claim 2, wherein the at least one of the plurality of detectors detects whether or not the reflected light is received during a prescribed amount of time from a time of the irradiating of the light as the reflection condition.

6. The transporting apparatus according to claim 2, wherein the at least one of the plurality of detectors irradiates another irradiating light onto a first region, the first region is set based on a top surface height of the plurality of objects.

7. The transporting apparatus according to claim 2, wherein the at least one of the plurality of detectors irradiates another irradiating light onto a first region, the first region includes a side surface of the selected object in a vertically upward direction from a top surface height of the plurality of objects, and the at least one of the plurality of detectors detects the change from the first state to the second state in case that there is a change from a state in which the reflection condition is such that the reflected light is detected to a state in which the reflection condition is such that the reflected light is not detected.

8. The transporting apparatus according to claim 1, wherein at least one of the plurality of detectors, based on a characteristic value of a first image captured in a region that includes a side surface of the selected object in the first state, detects that the selected object is in a state in which the transporter transports the selected object in the second direction.

9. The transporting apparatus according to claim 8, wherein the region includes the side surface of the selected object above a top surface height of the plurality of objects in a vertical upward direction, and the at least one of the plurality of detectors detects the change from the first state to the second state in case that the characteristic value changes.

10. The transporting apparatus according to claim 1, wherein at least one of the plurality of detectors irradiates projected light onto a region that includes a side surface of the selected object in the first state and, detects the change from the first state to the second state based on a characteristic value of an image captured in a range that includes the region.

11. The transporting apparatus according to claim 10, wherein the region is set based on a top surface height of the plurality of objects.

12. The transporting apparatus according to claim 10, wherein the region includes a side surface of the selected object vertically above the top surface height of the plurality of objects, and the at least one of the plurality of detectors detects a change from the first state to the second state in case that the characteristic value changes.

13. The transporting apparatus according to claim 1, wherein at least one of the plurality of detectors detects the change from the first state to the second state based on a space formed by at least the selected object and the plurality of objects.

14. The transporting apparatus according to claim 13, wherein the space is formed below a bottom surface of the selected object in a vertical direction, and the at least one of the plurality of detectors detects the change from the first state to the second state in case that the space changes.

15. The transporting apparatus according to claim 1, wherein at least one of the plurality of detectors detects the change from the first state to the second state based on a surface area of a side surface of the selected object exposed without hindrance by any object of the plurality of objects other than the selected object surrounding the object.

16. The transporting apparatus according to claim 15, wherein the at least one of the plurality of detectors detects the surface area of the side surface of the selected object exposed above a top surface height of the plurality of objects in a vertical direction.

17. A transporting apparatus, comprising:
    a transporter configured to hold a selected object from among a plurality of objects and transport the selected object in a first direction in a first state, and then configured to transport the selected object, while holding the selected object, to a second direction different from the first direction, in a second state;

a plurality of detectors configured to detect whether another object disturbs the transporter from transporting the selected object in the second direction; and a controller configured to control the transporter to stop transporting the selected object in the first direction and control the transporter to transport the selected object in the second direction in the second state, in case that the detector does not detect that the other object disturbs the transporter from transporting the selected object in the second direction.

* * * * *